US009584612B2

(12) United States Patent
Zheng et al.

(10) Patent No.: US 9,584,612 B2
(45) Date of Patent: Feb. 28, 2017

(54) SYSTEMS AND METHODS FOR PUSHING APPLICATIONS

(71) Applicant: Tencent Technology (Shenzhen) Company Limited, Shenzhen (CN)

(72) Inventors: Zhihao Zheng, Shenzhen (CN); Yan Zhao, Shenzhen (CN); Yiguo Yang, Shenzhen (CN); Yanping Guan, Shenzhen (CN); Songtao Lin, Shenzhen (CN); Rongjin Zheng, Shenzhen (CN); Mengting Jiang, Shenzhen (CN); Tantan Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/753,180

(22) Filed: Jun. 29, 2015

(65) Prior Publication Data

US 2015/0304440 A1 Oct. 22, 2015

Related U.S. Application Data

(63) Continuation of application No. PCT/CN2013/091257, filed on Dec. 31, 2013.

(30) Foreign Application Priority Data

Jun. 28, 2013 (CN) .......................... 2013 1 0268695

(51) Int. Cl.
*G06F 9/445* (2006.01)
*H04L 29/08* (2006.01)
*H04W 4/00* (2009.01)

(52) U.S. Cl.
CPC ................. *H04L 67/26* (2013.01); *G06F 8/61* (2013.01); *H04L 67/10* (2013.01); *H04W 4/001* (2013.01); *H04L 67/34* (2013.01)

(58) Field of Classification Search
CPC ............ G06F 8/61; H04L 67/26; H04W 4/001
See application file for complete search history.

(56) References Cited

U.S. PATENT DOCUMENTS 8,924,928 B1* 12/2014 Belovich ............... H04L 63/101
706/45
2005/0216594 A1* 9/2005 O'Brien .................. G06F 9/546
709/227

(Continued)

FOREIGN PATENT DOCUMENTS

| CN | 1649300 A | 8/2005 |
|---|---|---|
| CN | 102075539 A | 5/2011 |
| CN | 103338254 A | 10/2013 |

OTHER PUBLICATIONS

Patent Cooperation Treaty, International Search Report and Written Opinion o the International Searching Authority, mailed Apr. 3, 2014, in PCT/CN2013/091257.

(Continued)

*Primary Examiner* — Chameli Das
(74) *Attorney, Agent, or Firm* — Jone Day

(57) ABSTRACT

Systems and methods are provided for cross-terminal pushing of applications. For example, installation information of an application corresponding to an application-push event in a browser opened in a first terminal is acquired upon detection of the application-push event being triggered; the first terminal sends a push instruction to a server, the push instruction carrying the installation information of the application; the server sends the installation information of the application to one or more second terminals related to the first terminal; the second terminals send the installation information of the application; and the second terminals install the application based on at least information associated with the installation information of the application.

11 Claims, 26 Drawing Sheets

(56) References Cited

U.S. PATENT DOCUMENTS

| | | | | |
|---|---|---|---|---|
| 2006/0015854 A1* | 1/2006 | Muhlestein | ............... | G06F 9/46 717/130 |
| 2007/0019561 A1* | 1/2007 | Peterson | ................. | H04L 29/06 370/252 |
| 2012/0109741 A1* | 5/2012 | Ballapragada | ..... | G06Q 30/0277 705/14.43 |
| 2013/0036000 A1* | 2/2013 | Giordano | ............... | G06Q 40/02 705/14.27 |
| 2014/0059115 A1* | 2/2014 | Zhang | ..................... | H04L 67/10 709/203 |

OTHER PUBLICATIONS

Patent Cooperation Treaty, International Preliminary Report on Patentability, issued Dec. 29, 2015, in PCT/CN2013/091257.

\* cited by examiner

SYSTEMS AND METHODS FOR PUSHING APPLICATIONS

CROSS-REFERENCES TO RELATED APPLICATIONS

This application is a continuation of International Application No. PCT/CN2013/091257, with an international filing date of Dec. 31, 2013, now pending, which claims priority to Chinese Patent Application No. 201310268695.7, filed Jun. 28, 2013, both applications being incorporated by reference herein for all purposes.

BACKGROUND OF THE INVENTION

Certain embodiments of the present invention are directed to computer technology. More particularly, some embodiments of the invention provide systems and methods for communication technology. Merely by way of example, some embodiments of the invention have been applied to applications. But it would be recognized that the invention has a much broader range of applicability.

With development of terminal technologies, functionality of a terminal has become increasingly mature and there are more and more terminal-based applications (e.g., apps). It is a common operation of a terminal user to access the Internet via a terminal for downloading and installation of various applications. Many users own a plurality of terminals, including a personal computer (PC), a cell phone and a tablet. Sometimes, a user may want to install a same application on more than one terminal or choose an application in a browser of a terminal to install the application on another terminal.

For instance, a user finds an application in a PC browser and wants to install it on his cell phone. Current approaches include: 1. the user downloads the installation package of the application onto the PC, transmits the installation package to the cell phone via a flash memory, a data cable or Bluetooth and installs the application on the cell phone; 2. the user downloads the installation package of the application onto the PC, transmits the installation package to the cell phone via a same client (e.g., QQ) installed on both the PC and the cell phone and installs the application on the cell phone; or 3. the user installs a client designed for wireless data push on the PC and the cell phone and uses the client installed on the PC to push the application to the same client installed on the cell phone, hence realizing cross-terminal pushing of applications. Although the last approach is faster and more convenient than the first two approaches, the user still needs to install the corresponding client on both the PC and the cell phone for pushing applications, which complicates operations.

Hence it is highly desirable to improve the techniques for pushing applications.

BRIEF SUMMARY OF THE INVENTION

According to one embodiment, a method is provided for cross-terminal pushing of applications. For example, installation information of an application corresponding to an application-push event in a browser opened in a first terminal is acquired upon detection of the application-push event being triggered; the first terminal sends a push instruction to a server, the push instruction carrying the installation information of the application; the server sends the installation information of the application to one or more second terminals related to the first terminal; the second terminals send the installation information of the application; and the second terminals install the application based on at least information associated with the installation information of the application.

According to another embodiment, a method is provided for cross-terminal pushing of applications. For example, installation information of an application corresponding to an application-push event in a browser opened in a first terminal is acquired upon detection of the application-push event being triggered; and the first terminal sends a push instruction that carries the installation information of the application to a server, so that the server sends the installation information of the application to one or more second terminals related to the first terminal and the second terminals install the application based on at least information associated with the installation information of the application.

According to yet another embodiment, a method is provided for cross-terminal pushing of applications. For example, a server receives a push instruction from a first terminal, where the push instruction carries installation information of an application corresponding to an application-push event being triggered in a browser opened in the first terminal; and the server sends the installation information of the application to one or more second terminals related to the first terminal so that the second terminals install the application based on at least information associated with the installation information of the application.

According to yet another embodiment, a method is provided for cross-terminal pushing of applications. For example, one or more second terminals receive installation information of an application from a server and install the application based on at least information associated with the installation information of the application. The installation information of the application is sent to the server by a first terminal related to the second terminals and the application corresponds to an application-push event being triggered in a browser opened in the first terminal.

In one embodiment, a device for cross-terminal pushing of applications includes: an event-detection module configured to detect whether an application-push event in a browser opened in a first terminal is triggered, an information-acquisition module configured to, in response to the event-detection module detecting that the application-push event is triggered, acquire installation information of an application corresponding to the application-push event, and a message-transmission module configured to send a push instruction to a server, wherein the push instruction carries the installation information of the application, so that the server sends the installation information of the application to one or more second terminals related to the first terminal.

In another embodiment, a first terminal installed with a browser includes: a loading module configured to load a device for cross-terminal pushing of applications in the browser. The device includes: an event-detection module configured to detect whether an application-push event is triggered; an information-acquisition module configured to, in response to the event-detection module detecting that the application-push event is triggered, acquire installation information of an application corresponding to the application-push event; and a message-transmission module configured to send a push instruction to a server, wherein the push instruction carries the installation information of the application, so that the server sends the installation information of the application to one or more second terminals.

In yet another embodiment, a device for cross-terminal pushing of applications operating on a first terminal includes: a message-receiving module configured to receive a push message sent by a server, wherein the push message that carries installation information of an application is sent to the server by a second terminal related to the first terminal and the application corresponds to an application-push event triggered in a browser opened in the second terminal; and an application-installation module configured to install the application according to the installation information of the application.

In yet another embodiment, a device for cross-terminal pushing of applications operating on a server includes: an instruction-receiving module configured to receive a push instruction from a first terminal, wherein the push instruction carries installation information of an application corresponding to an application-push event triggered in a browser opened in the first terminal; and a message-sending module configured to send an application-push message to one or more second terminals related to the first terminal, wherein the application-push message contains the installation information of the application, so that the second terminals install the application based on at least information associated with the installation information of the application.

According to one embodiment, a system for cross-terminal pushing of applications includes: a first terminal, one or more second terminals and a server. The first terminal installed with a browser includes: a loading module configured to load a first device in the browser. The first device includes: an event-detection module configured to detect whether an application-push event is triggered; an information-acquisition module configured to, in response to the event-detection module detecting that the application-push event is triggered, acquire installation information of an application corresponding to the application-push event; and a message-transmission module configured to send a push instruction to a server, wherein the push instruction carries the installation information of the application, so that the server sends the installation information of the application to one or more second terminals. A second device that operates on the one or more second terminals includes: a message-receiving module configured to receive a push message sent by the server, wherein the push message that carries installation information of an application is sent to the server by the first terminal related to the second terminals and the application corresponds to an application-push event triggered in a browser opened in the first terminal; and an application-installation module configured to install the application according to the installation information of the application. A third device that operates on the server includes: an instruction-receiving module configured to receive a push instruction from a first terminal, wherein the push instruction carries installation information of an application corresponding to an application-push event triggered in a browser opened in the first terminal; and a message-sending module configured to send an application-push message to one or more second terminals related to the first terminal, wherein the application-push message contains the installation information of the application, so that the second terminals install the application based on at least information associated with the installation information of the application.

According to another embodiment, a non-transitory computer readable storage medium includes programming instructions for cross-terminal pushing of applications. The programming instructions configured to cause one or more data processors to execute certain operations. For example, installation information of an application corresponding to an application-push event in a browser opened in a first terminal is acquired upon detection of the application-push event being triggered; the first terminal sends a push instruction to a server, the push instruction carrying the installation information of the application; the server sends the installation information of the application to one or more second terminals related to the first terminal; the second terminals send the installation information of the application; and the second terminals install the application based on at least information associated with the installation information of the application.

According to yet another embodiment, a non-transitory computer readable storage medium includes programming instructions for cross-terminal pushing of applications. The programming instructions configured to cause one or more data processors to execute certain operations. For example, installation information of an application corresponding to an application-push event in a browser opened in a first terminal is acquired upon detection of the application-push event being triggered; and the first terminal sends a push instruction that carries the installation information of the application to a server, so that the server sends the installation information of the application to one or more second terminals related to the first terminal and the second terminals install the application based on at least information associated with the installation information of the application.

In one embodiment, a non-transitory computer readable storage medium includes programming instructions for cross-terminal pushing of applications. The programming instructions configured to cause one or more data processors to execute certain operations. For example, a server receives a push instruction from a first terminal, where the push instruction carries installation information of an application corresponding to an application-push event being triggered in a browser opened in the first terminal; and the server sends the installation information of the application to one or more second terminals related to the first terminal so that the second terminals install the application based on at least information associated with the installation information of the application.

In another embodiment, a non-transitory computer readable storage medium includes programming instructions for cross-terminal pushing of applications. The programming instructions configured to cause one or more data processors to execute certain operations. For example, one or more second terminals receive installation information of an application from a server and install the application based on at least information associated with the installation information of the application. The installation information of the application is sent to the server by a first terminal related to the second terminals and the application corresponds to an application-push event being triggered in a browser opened in the first terminal.

For example, the systems and methods described herein are configured to allow a web bookmark to capture link information of a present webpage of a browser. As an example, the web bookmark is located upon a user triggering event and then sent to the server. In one example, the server sends a transmission prompt message bundled with the web bookmark to a terminal and, upon receipt of a message transmission instruction from the terminal, transmits the information of the present webpage to the terminal for processing. As an example, the systems and methods described herein are configured to allow transmission of the webpage information between the bundled web bookmark and the terminal and realize transmission and sharing of page information, so as to facilitate the terminal bundled with the web bookmarks to process the shared information and improve information processing.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
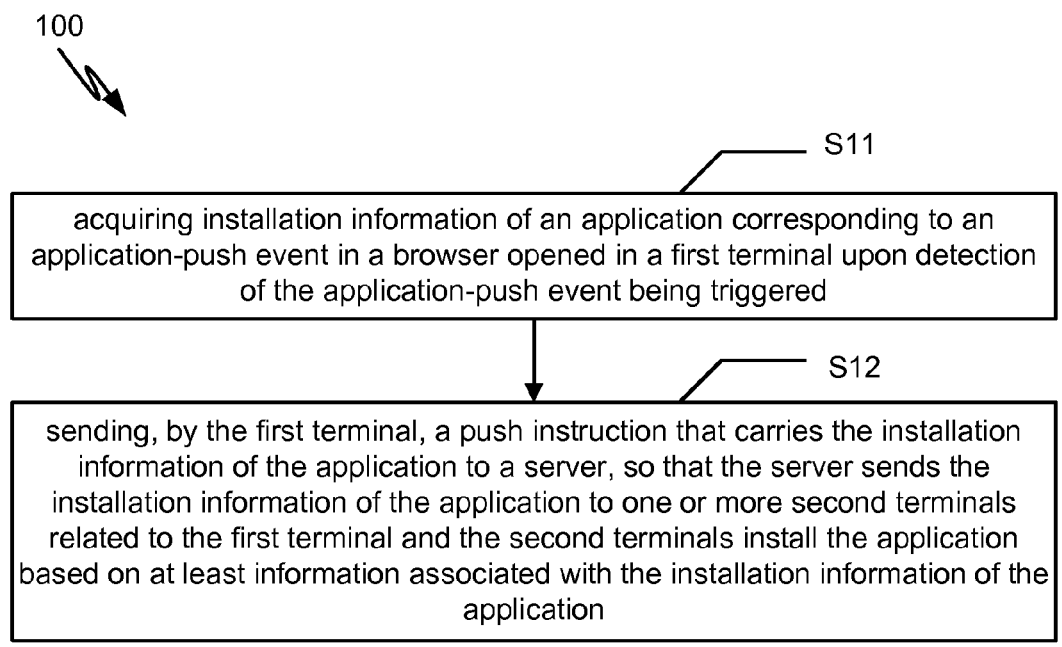
FIG. 1 is a simplified diagram showing a method for cross-terminal pushing of applications according to one embodiment of the present invention.

FIG. 1 is a simplified diagram showing a method for cross-terminal pushing of applications according to one embodiment of the present invention. This diagram is merely an example, which should not unduly limit the scope of the claims. One of ordinary skill in the art would recognize many variations, alternatives, and modifications. The method 100 includes at least the processes S11-S12.

According to one embodiment, the process S11 includes: acquiring installation information of an application corresponding to an application-push event in a browser opened in a first terminal upon detection of the application-push event being triggered. For example, the application-push event is triggered when the user clicks on a triggering widget of the application-push event in the browser opened in the first terminal; or the user selects the application-push event in the browser opened in the first terminal. As an example, an application-push event corresponds to an application independently. The installation information of the application may contain an application identifier, and/or a download address, format information, an icon, a name, a size, a supported operating environment and a version number of the application. For example, the download address of the application includes a URL (Uniform/Universal Resource Locator) address of the application or the storage address of the application. The identifier of the application is used to uniquely identify the application. The application identifier may be identification (ID) or a serial number of the application. The format information of the application may be used to differentiate the types of the terminals supported by the application.

According to another embodiment, during the process S12, the first terminal sending a push instruction to a server, where the push instruction carries the installation information of the application, so that the server sends the installation information of the application to one or more second terminals related to the first terminal and the second terminals install the application according to the installation information of the application. For example, besides the installation information of the application, the push instruction may also carry a type identifier of the push instruction. As an example, the type identifier of the push instruction includes a first predefined identifier or a second predefined identifier, where the first predefined identifier is configured to instruct the second terminals to immediately install the application and the second predefined identifier is configured to instruct the second terminals to install the application according to operations of a user.

Figure 2:
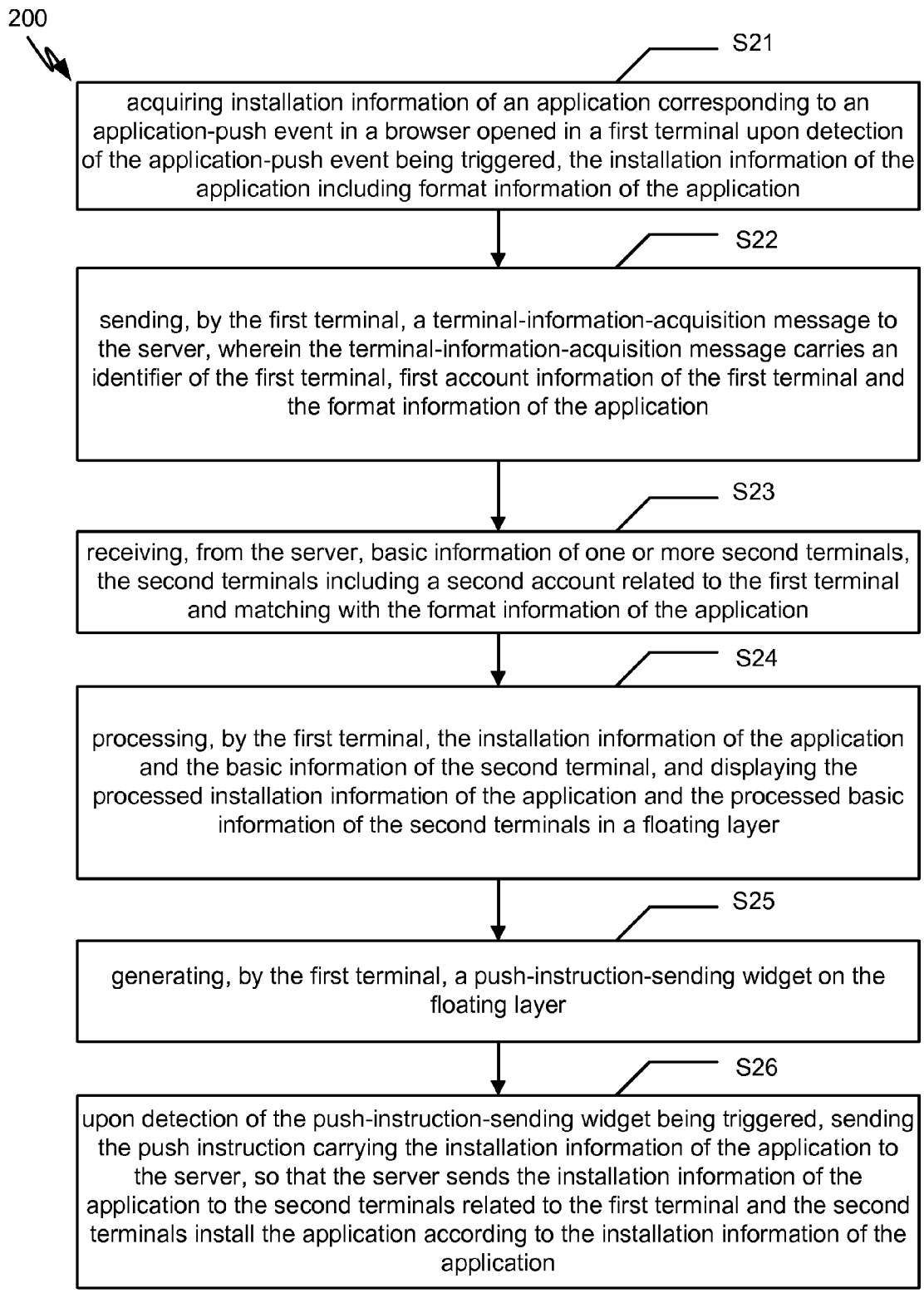
FIG. 2 is a simplified diagram showing a method for cross-terminal pushing of applications according to another embodiment of the present invention.

FIG. 2 is a simplified diagram showing a method for cross-terminal pushing of applications according to another embodiment of the present invention. This diagram is merely an example, which should not unduly limit the scope of the claims. One of ordinary skill in the art would recognize many variations, alternatives, and modifications. The method 200 includes at least the processes S21-S26.

According to one embodiment, the process S21 includes: upon detection of triggering of an application-push event in a browser opened in a first terminal, acquiring installation information of an application corresponding to the application-push event, where the installation information contains the application identifier and the format information of the application. For example, the user may directly open the browser in the first terminal and log in via the account information. In another example, the user may log in the application linked to the browser in the first terminal via the account information (such as an instant messaging tool QQ) and then click on the link of the browser in the application to open the browser. As an example, when the user inputs the account information, the first terminal receives and stores the account information and the account information may be used as the account information of the first terminal. In one example, upon first use of the account information, the terminal reports the account information and the basic information of the terminal to the server and the server records such information in an account list which records the basic information of all terminals corresponding to each account. For example, the basic information of the terminal may include an identifier, a terminal type (such as an iOS terminal or an Android terminal) and other data of the terminal. The account list further records user relationship between accounts. The identifier of the terminal may include a cell phone number, a SIM card number, a factory serial number or any other identifiers which can uniquely identify the terminal. In another example, the installation information of the application includes the application identifier and format information of the application. In yet another example, the application may be in different formats and different types of terminals can only be installed with the applications of which the formats the terminals support. For instance, the application formats supported by a terminal that uses an iOS system include ipa, pxl and deb. In another example, the application formats supported by a terminal that uses an Android system include apk. In yet another example, the application formats supported by a terminal that uses a S60 system include sis and sisx. In yet another example, the application formats supported by a terminal that uses a Windows system include xap. In yet another example, each format has a corresponding download address, and the installation information of the application may include the application identifier, the download address and/or the format information of the application as well as the download address of each format.

According to another embodiment, during the process S22, the first terminal sends a terminal-information-acquisition message to the server, where the terminal-information-acquisition message carries an identifier of the first terminal, account information of the first terminal and the format information of the application. For example, the process S23 includes: receiving basic information of the second terminals which has an account related to the first terminal and matches with the format information of the application returned by the server. In another example, the server searches the account list for the second terminals which has an account related to the first terminal according to the account information of the first terminal after receiving the account information of the first terminal and the format information of the application. For instance, the server receives the terminal-information-acquisition message from the first terminal, where the terminal-information-acquisition message carries the identifier TD1 of the first terminal, the account UserID1 of the first terminal and the format information apk of the application. The server finds the terminals corresponding to UserID1 in the account list according to UserID1. If the corresponding terminals found also include a second terminal TD2 and a third terminal TD3 besides the first terminal, the server determines if TD2 and TD3 match the format information ISO1 of the application. For example, if the system of TD2 is iOS and the system of TD3 is Android, the server determines that TD3 matches with ISO1 and TD2 does not match with IOS1. The server then returns the basic information of TD3. In another example, if the system of TD2 is Android and the system of TD3 is Android, the server determines both TD2 and TD3 match with ISO1 and returns the basic information of TD2 and TD3.

According to yet another embodiment, during the process S24, the first terminal processes the installation information of the application and the basic information of the second terminals and displaying the processed installation information of the application and the basic information of the second terminals in a floating layer. For example, the floating layer (e.g., a pop-up layer) may be a page floating on a present webpage of the browser or a window floating on the present webpage of the browser. As an example, the floating layer may always display at a specific position of the screen and do not roll with the screen. In another example, during the process S25, the first terminal generates a push-instruction-sending widget on the floating layer. In yet another example, the process S26 includes: sending a push instruction to the server upon detection of the push-instruction-sending widget being triggered, where the push instruction carries the installation information of the application, so that the server sends the installation information of the application to one or more second terminals related to the first terminal and the second terminals install the application according to the installation information of the application. In yet another example, during the process S23, if the relevant information of the second terminals returned by the server contains relevant information of a plurality of second terminals (e.g., TD2 and TD3), a plurality of selection widgets corresponding to the plurality of second terminals are generated on the floating layer for the user to select from. In yet another example, during the process S26, the push instruction further carries an identifier of the second terminals selected by the user, and the server sends the installation information of the application to the second terminals with the identifier according to the identifier of the second terminals in the push instruction. For instance, if the user chooses TD2, the push instruction carries the identifier of TD2, and then the server sends to TD2 the installation information of the application according to the identifier of TD2.

Figure 3:
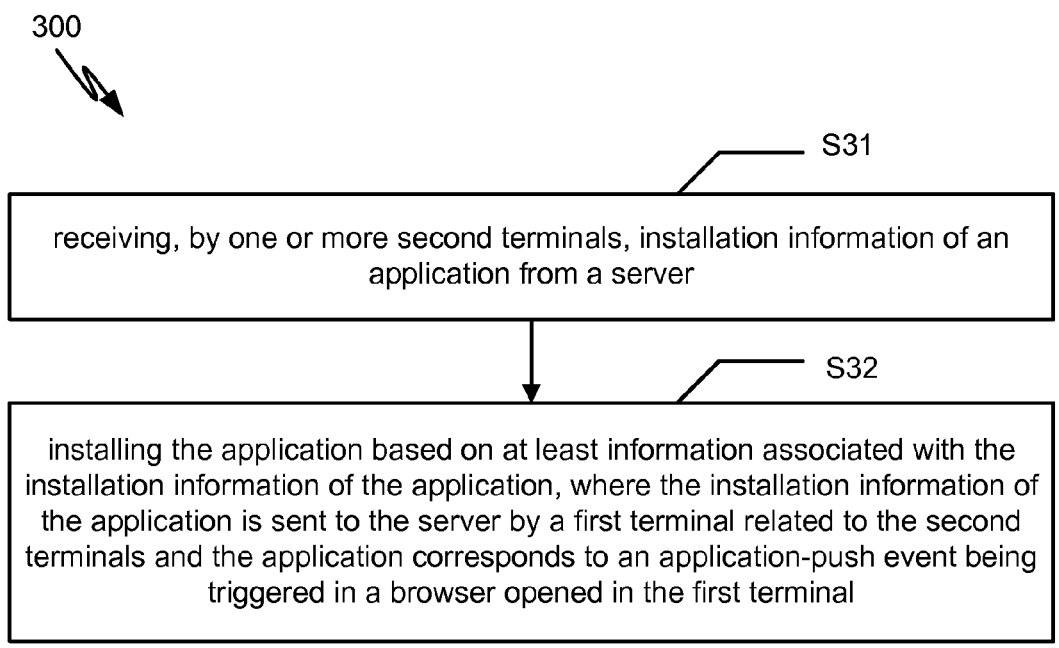
FIG. 3 is a simplified diagram showing a method for cross-terminal pushing of applications according to yet another embodiment of the present invention.

FIG. 3 is a simplified diagram showing a method for cross-terminal pushing of applications according to yet another embodiment of the present invention. This diagram is merely an example, which should not unduly limit the scope of the claims. One of ordinary skill in the art would recognize many variations, alternatives, and modifications. The method 300 includes at least the processes S31-S32.

According to one embodiment, during the process S31, one or more second terminals receive installation information of an application sent from a server. For example, after user login via certain account information upon startup of the second terminals, the second terminals start to receive the installation information of the application sent from the server. As an example, the account information which the user uses for login of the second terminals (e.g., the account information of the second terminals) is related to the account information which the user uses for login of the first terminal (e.g., the account information of the first terminal). In another example, both the second terminals and the first terminal are owned by a user, and the account information stored on the first terminal and the account information stored on the second terminals are the same. In yet another example, the second terminals may be owned by a friend of the user, and the account information stored on the first terminal has established a user relation with the account information stored on the second terminals, where the relation is recorded in the account list.

According to another embodiment, the process S32 includes: installing the application according to the installation information of the application, where the installation information of the application is sent to the server by a first terminal related to the second terminals and the application corresponds to an application-push event triggered in a browser opened in the first terminal. For example, after receiving the installation information of the application, the second terminals can install the application according to the installation information of the application. Specifically, if the installation information of the application contains the application identifier and a download address of the application, the second terminals determine if the application corresponding to the application identifier has been installed on the second terminals according to the application identifier. If the application is not installed on the second terminals and the installation information of the application contains the download address of the application, the second terminals can download the installation package of the application according to the download address and install the application. In another example, if the installation information of the application contains the application identifier and the second terminals find that the application is not installed on the second terminals according to the application identifier, the second terminals send a download request message to the server, where the download request message carries the application identifier of the application and the terminal type of the second terminal.

According to yet another embodiment, the server receives the download request message, acquires the installation package of the application according to the application identifier and the terminal type carried in the download request message and sends the installation package of the application to the second terminal. The second terminals receive the installation package of the application and install the application. Specifically, the server determines the formats of applications supported by the second terminals according to the terminal type of the second terminal, acquires the corresponding download address from the correspondence among the stored application identifier, the application format and the download address according to the stored application identifier and the application formats supported by the second terminal, and acquires the installation package of the application according to the download address. In yet another example, the server stores a correspondence between the terminal type and the application format beforehand so that the server can acquire the corresponding application format from the stored correspondence between the terminal type and the application format according to the terminal type of the second terminal. The acquired application formats are supported by the second terminals.

In one embodiment, the server determines the application formats supported by the second terminals according to the terminal type of the second terminals and acquires the corresponding application identifier and the application format from the correspondence among the stored application identifier, the application format and the download address according to the download address. For example, if the application format is among the formats supported by the second terminals, the server acquires the installation package of the application according to the download address. Otherwise, the server acquires the corresponding download address from the correspondence between the stored application identifier, the application format and the download address according to the application identifier and the application formats supported by the second terminals and acquires the installation package of the application according to the download address. In another example, if the application corresponding to the application identifier is already installed, the second terminals can display to the user a prompt message to prompt the user that the application has been installed and then end the operation. In yet another example, the second terminals can firstly detect its network environment before downloading or receiving the installation package of the application. If the network environment does not include a Wi-Fi environment, a data flow prompt window pops up to prompt the user that continuing to install the application consumes data flow (e.g., data usage, bandwidth). Further, a selection window may pop up for the user to choose whether to continue the installation or not, and the installation can be continued or cancelled according to the user choice. In yet another example, the second terminals may automatically monitor the network environment during installation of the application. If the network is switched to 2G/3G and other data-flow-consuming networks, the second terminals may pop up a prompt message to prompt the user to suspend the download and automatically monitor the changes of the network environment. The download can be resumed from the interruption point when a Wi-Fi network becomes available.

Figure 4:
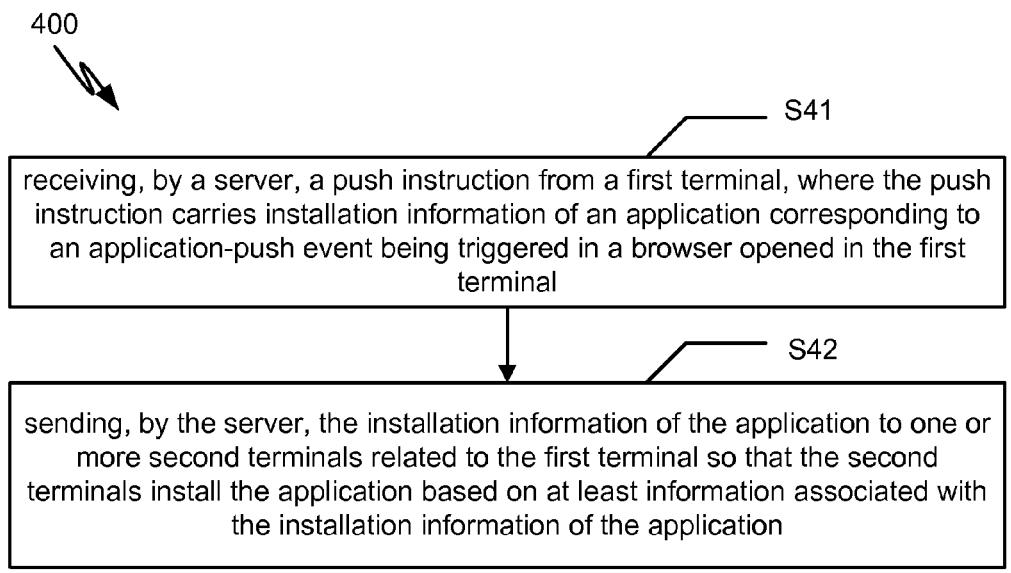
FIG. 4 is a simplified diagram showing a method for cross-terminal pushing of applications according to yet another embodiment of the present invention.

FIG. 4 is a simplified diagram showing a method for cross-terminal pushing of applications according to yet another embodiment of the present invention. This diagram is merely an example, which should not unduly limit the scope of the claims. One of ordinary skill in the art would recognize many variations, alternatives, and modifications. The method 400 includes at least the processes S41-S42.

According to one embodiment, during the process S41, a server receives a push instruction from a first terminal, where the push instruction carries installation information of an application and the application corresponds to an application-push event triggered in a browser opened in the first terminal. For example, during the process S42, the server sends the installation information of the application to one or more second terminals related to the first terminal so that the second terminals install the application according to the installation information of the application. In another example, after receiving the push instruction from the first terminal, the server can firstly acquire the basic information of the second terminals related to the first terminal via the network or read the basic information of the second terminals already stored in the server. The server may determine if the basic information satisfies the predetermined push conditions. If the basic information satisfies the push conditions, the server sends the installation information of the application to the second terminal. Otherwise, the server downloads the installation package of the application to a cloud database according to the installation information of the application and records new installation information of the application. As an example, when the basic information of the second terminals satisfies the predetermined push conditions, the server sends the new installation information of the application to the second terminals so that the second terminals can install the application according to the new installation information of the application. The server can store offline the installation information of the application and the installation package and automatically push the installation information of the application to the second terminals when the second terminals satisfy the initial conditions for pushing an application. For example, the initial conditions for pushing an application include that the second terminals are on and have used an account the same as or related to the account of the first terminal.

According to another embodiment, specifically, the server can acquire the installation package of the application according to the application identifier contained in the installation information and the terminal type contained in the basic information of the second terminals and send the installation package to the cloud database. For example, the server acquires the installation package of the application according to the download address if the installation information also contains the download address of the application. In another example, the server determines the formats of applications supported by the second terminals according to the terminal type of the second terminal, acquires the corresponding download address from the correspondence among the stored application identifier, the application format and the download address according to the stored application identifier and the application formats supported by the second terminal, and acquires the installation package of the application according to the download address. In yet another example, the server stores the correspondence between the terminal type and the application format beforehand so that the server can acquire the corresponding application format from the stored correspondence between the terminal type and the application format according to the terminal type of the second terminal. The acquired application formats are supported by the second terminals.

Figure 5:
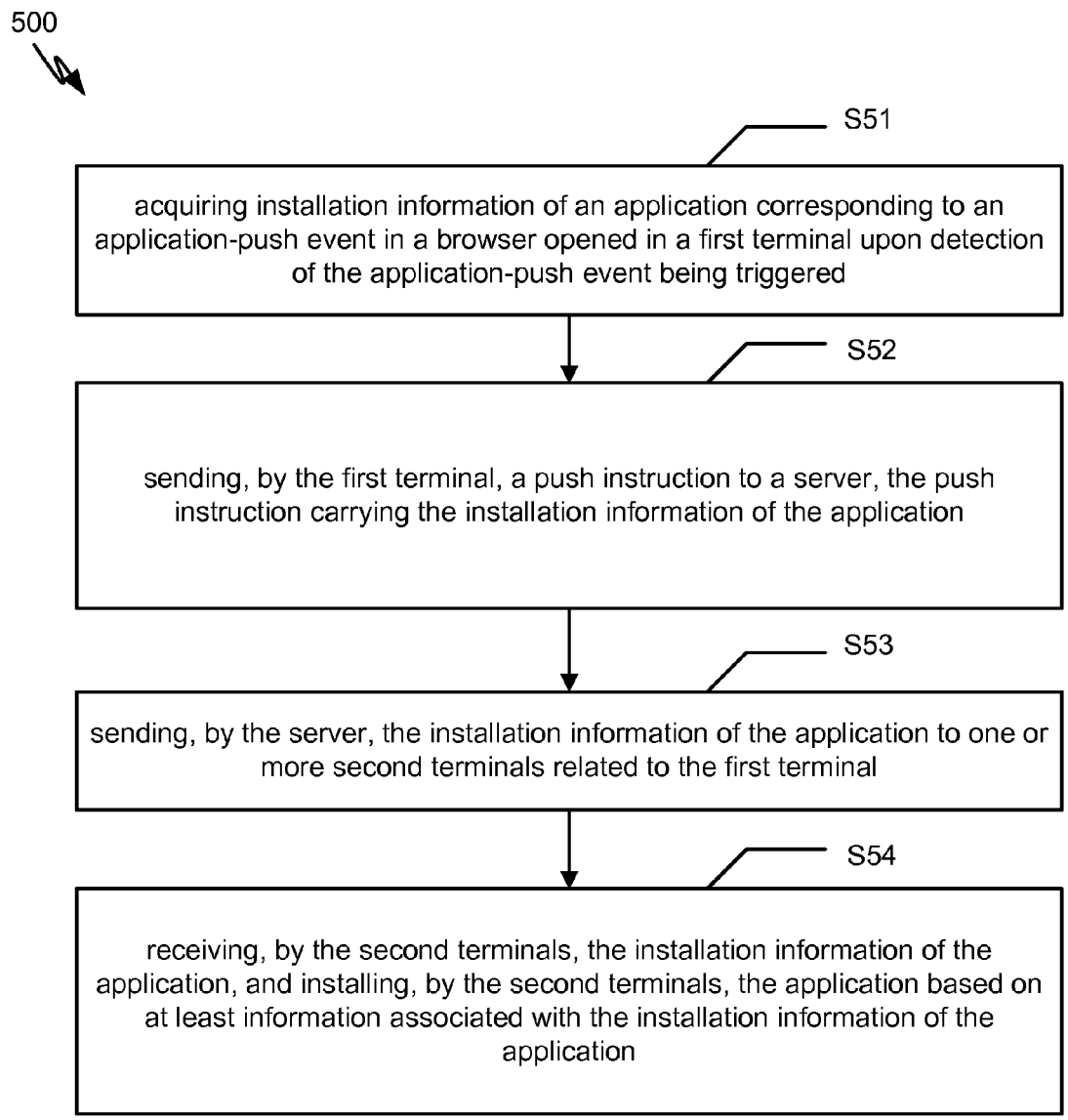
FIG. 5 is a simplified diagram showing a method for cross-terminal pushing of applications according to yet another embodiment of the present invention.

FIG. 5 is a simplified diagram showing a method for cross-terminal pushing of applications according to yet another embodiment of the present invention. This diagram is merely an example, which should not unduly limit the scope of the claims. One of ordinary skill in the art would recognize many variations, alternatives, and modifications. The method 500 includes at least the processes S51-S54.

According to one embodiment, the process S51 includes: upon detection of triggering of an application-push event in a browser opened in a first terminal, acquiring installation information of an application corresponding to the application-push event. For example, during the process 52, the first terminal sends a push instruction to a server, where the push instruction carries the installation information of the application. In another example, during the process 53, the server sends the installation information of the application to one or more second terminals related to the first terminal. In yet another example, during the process S54, the second terminals receives the installation information of the application and installing the application according to the installation information of the application.

Figure 6:
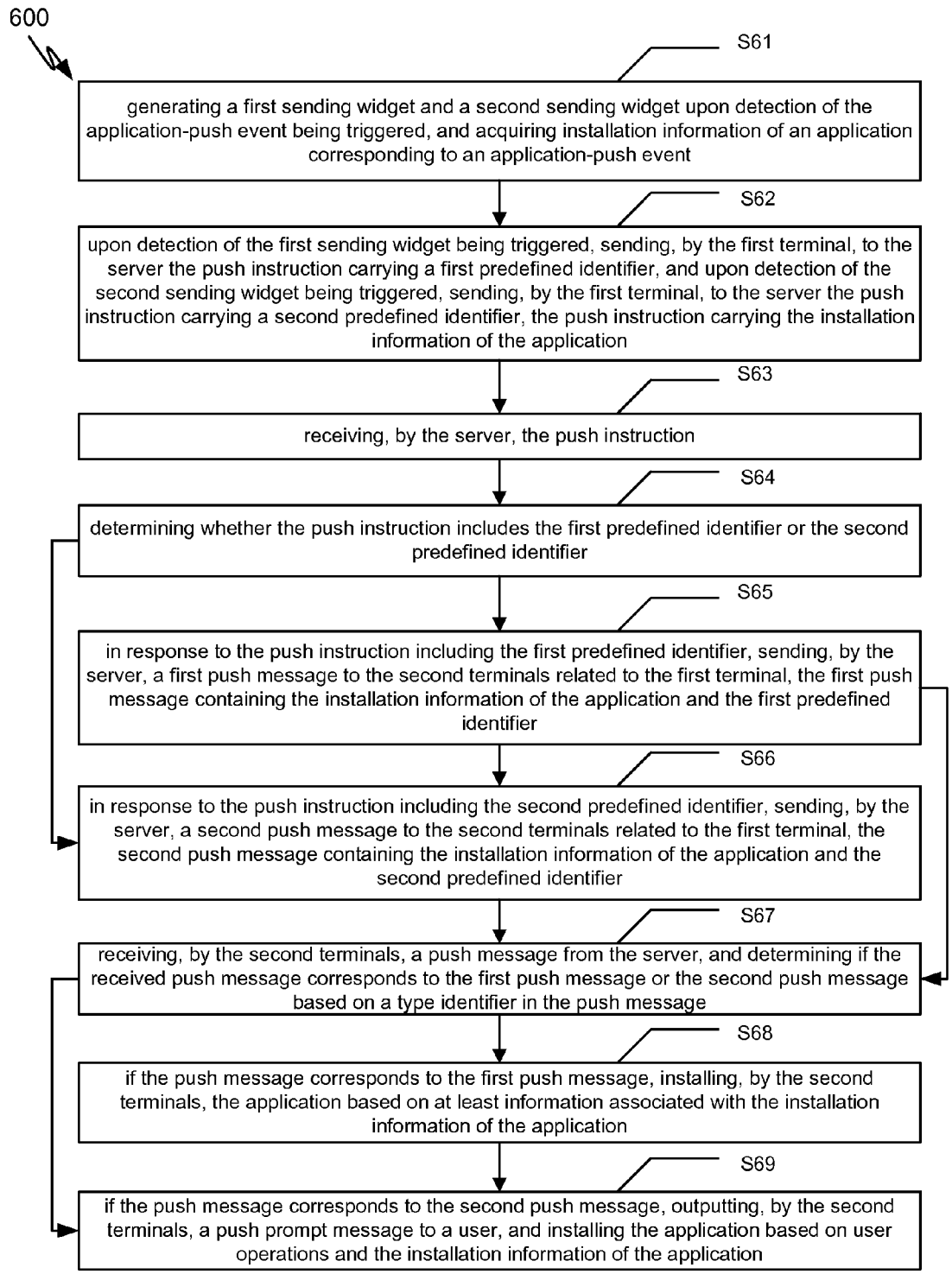
FIG. 6 is a simplified diagram showing a method for cross-terminal pushing of applications according to yet another embodiment of the present invention.

FIG. 6 is a simplified diagram showing a method for cross-terminal pushing of applications according to yet another embodiment of the present invention. This diagram is merely an example, which should not unduly limit the scope of the claims. One of ordinary skill in the art would recognize many variations, alternatives, and modifications. The method 600 includes at least the processes S61-S69.

According to one embodiment, the process S61 include: upon detection of an application-push event in a browser opened in a first terminal being triggered, generating a first sending widget and a second sending widget and acquiring installation information of an application corresponding to the application-push event. For example, the first sending widget and the second sending widget correspond to two push modes respectively. The first push mode includes that the second terminals install the application immediately upon receipt of the push message. The second push mode includes that only a message is distributed and the user can freely determine the appropriate installation time. For example, the second terminals install the application according to the operations of the user upon receipt of the push message.

According to another embodiment, during the process S62, the first terminal sends to the server the push instruction carrying a first predefined identifier upon detection of the first sending widget being triggered, and the first terminal sends to the server the push instruction carrying a second predefined identifier upon detection of the second sending widget being triggered, where the push instruction also carries the installation information of the application. For example, the first predefined identifier is configured to identify the push mode of the first sending widget and the second predefined identifier is configured to identify the push mode of the second sending widget. In another example, the first predefined identifier and the second predefined identifier may include codes, character strings and/or other suitable identification information recognizable by the server or the second terminals.

According to yet another embodiment, during the process S63, the server receives the push instruction. For example, during the process S64, the server determines whether the type identifier in the push instruction is the first predefined identifier or the second predefined identifier. In another example, if the type identifier is the first predefined identifier, the process S65 is executed. The server sends a first push message to the second terminals related to the first terminal, where the first push message contains the installation information of the application and the first predefined identifier. In another example, if the type identifier is the second predefined identifier, the process S66 is executed. The server sends a second push message to the second terminals related to the first terminal, where the second push message contains the installation information of the application and the second predefined identifier. In yet another example, during the process S67, the second terminals receive the push message from the server and determine whether the push message is the first push message or the second push message according to the type identifier in the push message. If the push message is the first push message, the process S68 is executed. The second terminals install the application according to the installation information of the application. If the push message is the second push message, the process S69 is executed. The second terminals output a push prompt message to the user and install the application according to the user operation and the installation information of the application.

Figure 7A:
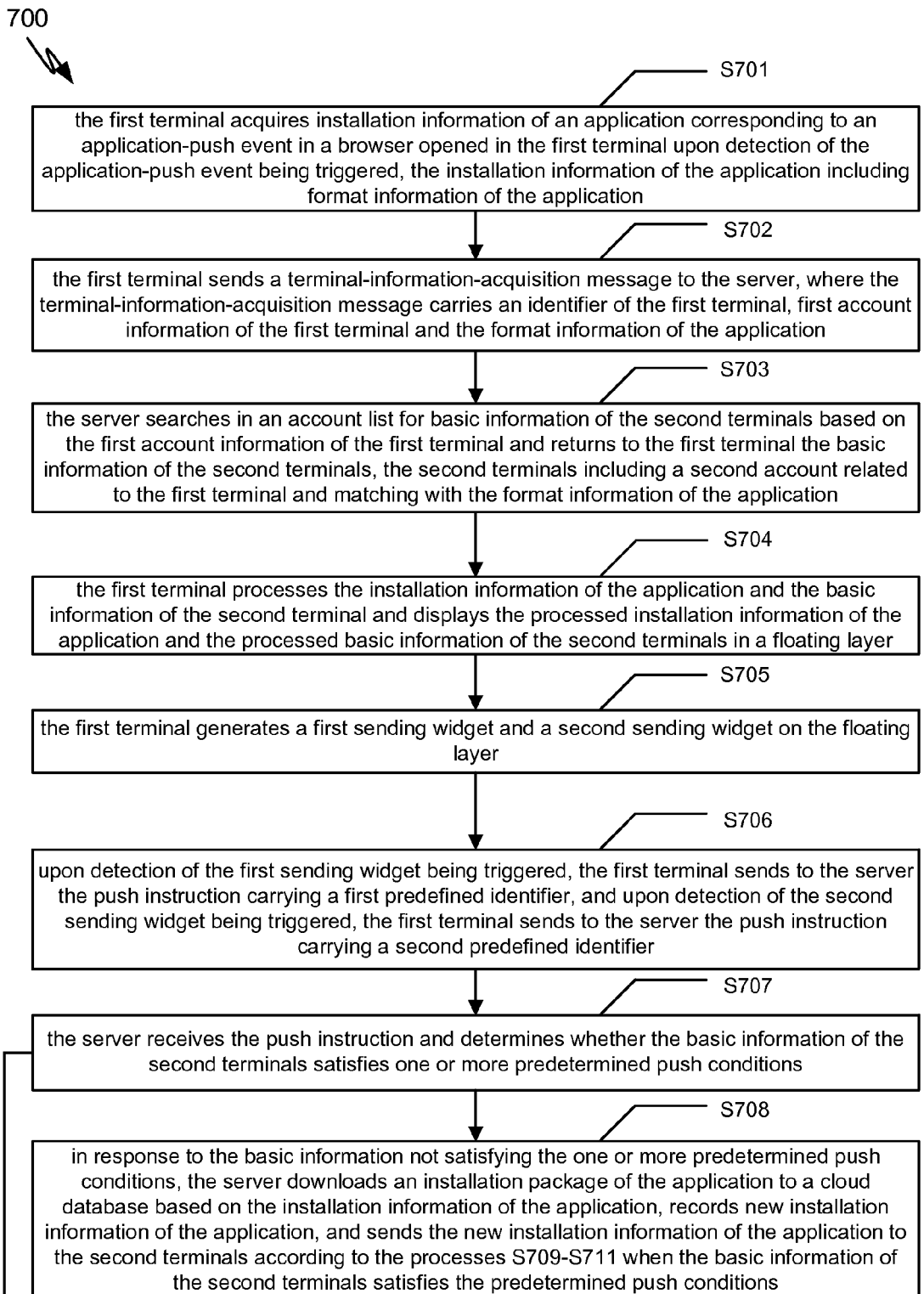
FIG. 7(A) and FIG. 7(B) are simplified diagrams showing a method for cross-terminal pushing of applications according to yet another embodiment of the present invention.
Figure 7B:
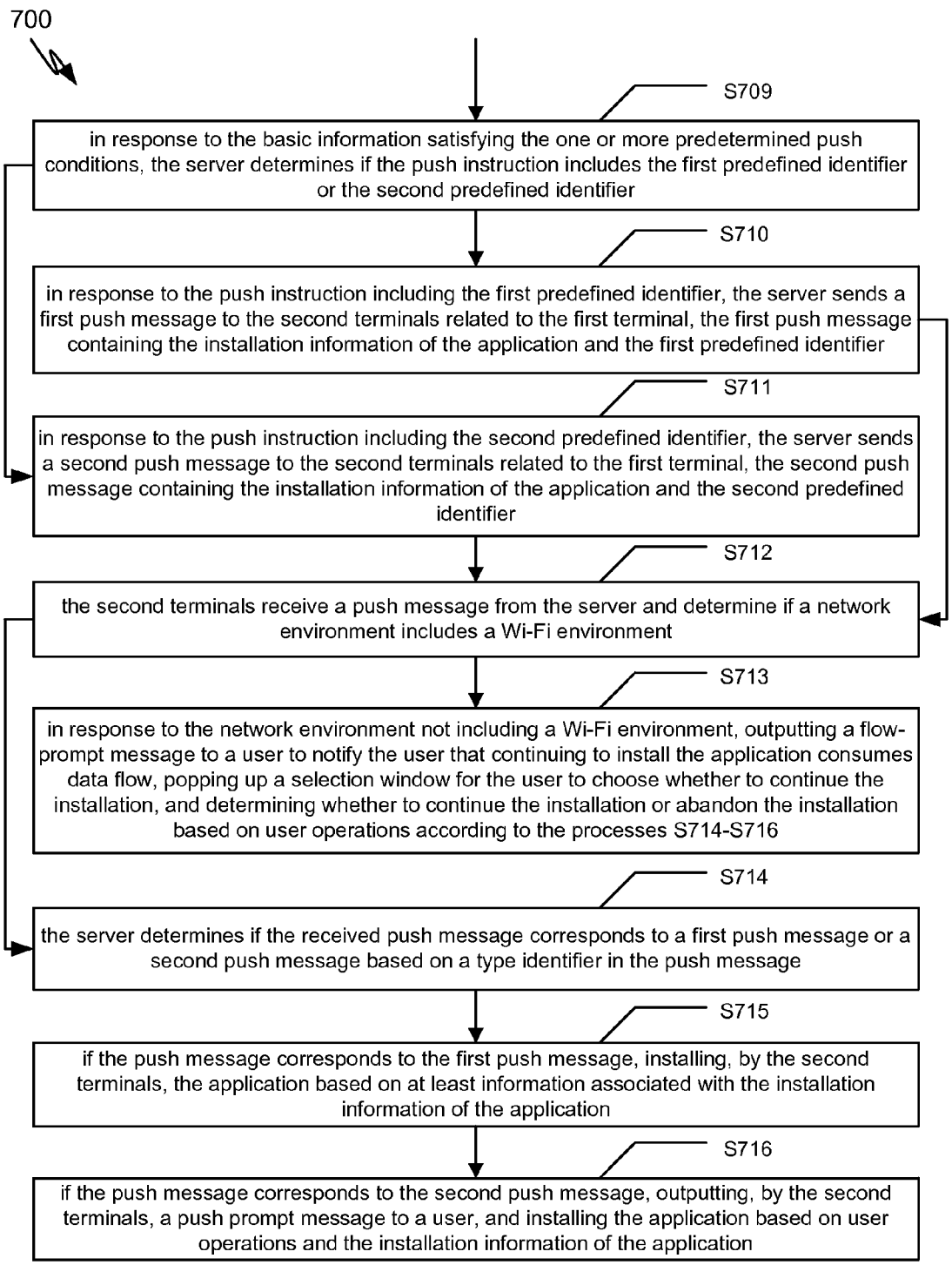

FIG. 7(A) and FIG. 7(B) are simplified diagrams showing a method for cross-terminal pushing of applications according to yet another embodiment of the present invention. These diagrams are merely examples, which should not unduly limit the scope of the claims. One of ordinary skill in the art would recognize many variations, alternatives, and modifications. The method 700 includes at least the processes S701-S716.

According to one embodiment, during the process S701, the first terminal detects that an application-push event in a browser opened is triggered, and acquires installation information of an application corresponding to the application-push event, where the installation information contains the application identifier and the format information of the application. For example, during the process S702, the first terminal sends a terminal-information-acquisition message to the server, where the terminal-information-acquisition message carries an identifier and account information of the first terminal and the format information of the application. In another example, during the process S703, the server searches an account list for basic information of the second terminals which has an account related to the first terminal and matches the format information of the application according to the account information of the first terminal in the terminal-information-acquisition message, and returns the basic information of the second terminals to the first terminal.

According to another embodiment, during the process S704, the first terminal processes the installation information of the application and the basic information of the second terminals and displays the processed installation information of the application and the basic information of the second terminals in a floating layer. For example, during the process S705, the first terminal generates a first sending widget and a second sending widget on the floating layer. In another example, during the process S706, the first terminal sends to the server the push instruction carrying a first predefined identifier upon detection of the first sending widget being triggered. The first terminal sends to the server the push instruction carrying a second predefined identifier upon detection of the second sending widget being triggered, where the push instruction also carries the installation information of the application.

According to yet another embodiment, during the process S707, the server receives the push instruction and determines if the basic information of the second terminals satisfies predetermined push conditions. For example, if the basic information of the second terminals does not satisfy the push conditions, the process S708 is executed. An installation package of the application is downloaded to a cloud database according to the installation information of the application. New installation information of the application is recorded. If the basic information of the second terminals satisfies the predetermined push conditions, the server sends the new installation information of the application to the second terminals according to the processes S709-S711.

In one embodiment, If the basic information of the second terminals satisfies the predetermined push conditions, the process S709 is executed. For example, the server determines whether the type identifier in the push instruction is the first predefined identifier or the second predefined identifier. In another example, if the type identifier is the first predefined identifier, the process S710 is executed. The server sends a first push message to the second terminals related to the first terminal, where the first push message contains the installation information of the application and the first predefined identifier. If the type identifier is the second predefined identifier, the process S711 is executed. The server sends a second push message to the second terminals related to the first terminal, where the second push message contains the installation information of the application and the second predefined identifier. In yet another example, during the process S712, the second terminals receives the push message sent from the sever and detecting if the network environment includes a Wi-Fi environment. If the network environment does not include a Wi-Fi environment, the process S713 is executed. A flow-prompt message is output to the user to prompt the user that continuing to install the application consumes data flow (e.g., data usage, bandwidth), and a selection window pops up for the user to choose whether to continue the installation or not. Based on the user choice, the application is continued to be installed according to the processes S714-S716, or the application installation is cancelled.

In another embodiment, if the network environment includes a Wi-Fi environment, the process S714 is executed. For example, the server determines whether the received push message is a first push message or a second push message according to the type identifier in the push message. If the received push message is the first push message, the process S715 is executed. The second terminals install the application according to the installation information of the application. If the received push message is the second push message, the process S716 is executed. The second terminals output a push prompt message to the user and install the application according to the user operations and the installation information of the application.

In yet another embodiment, during the process S703, if the relevant information of the second terminals returned by the server contains relevant information of a plurality of second terminals, a plurality of selection widgets corresponding to the plurality of second terminals are generated on the floating layer for the user to select from. For example, during the process S706, the push instruction further carries an identifier of the second terminals selected by the user, and the server sends the installation information of the application to the second terminals with the identifier according to the identifier of the second terminals in the push instruction. Further, the second terminals may generate an application message page while installing the application, where the application message page includes the download progress information of the application and a download progress management widget. The user can suspend or start the downloading process by clicking the download progress management widget.

FIG. 8(A)-FIG. 8(I) are simplified diagrams showing a process for cross-terminal pushing of applications according to some embodiments of the present invention. These diagrams are merely examples, which should not unduly limit the scope of the claims. One of ordinary skill in the art would recognize many variations, alternatives, and modifications.

According to one embodiment, a first terminal corresponds to a PC and a second terminal corresponds to a cell phone. For example, a user uses a browser in the PC and an instant messaging application in the cell phone simultaneously. As an example, if the user intends to push an application (such as QQ Supermarket) found via the browser in the PC to an application (such as QQ Space) on the cell phone, the user needs to trigger an application-push event in the PC browser, and send the installation information of the application via the PC to the instant messaging application on the cell phone to install the application on the cell phone. FIG. 8(A)-FIG. 8(I) show remote installation of an application on a cell phone through a single click on a search engine.

Figure 8A:
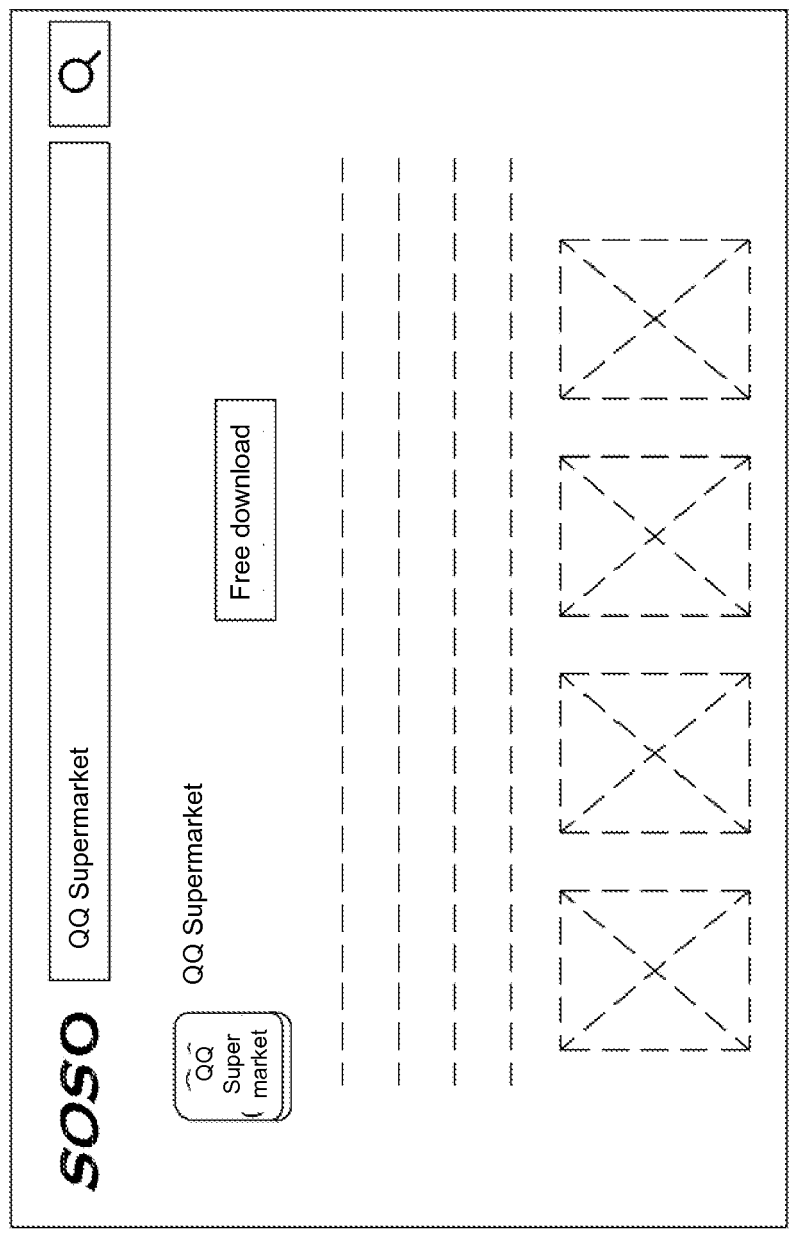
FIG. 8(A)-FIG. 8(I) are simplified diagrams showing a process for cross-terminal pushing of applications according to some embodiments of the present invention.

According to one embodiment, as shown in FIG. 8(A), the user directly accesses the browser in the PC or accesses the browser (such as SOSO browser) via the instant messaging tool (such as QQ), searches for QQ Supermarket and chooses to download the application. For example, the application-push event in the PC browser is triggered. When the user clicks on the "free download" button on the page, the PC acquires the installation information of QQ Supermarket which contains the format information, such as apk. As an example, the PC sends to the server the identifier of the PC, the user account information and the format information of QQ Supermarket. The server searches an account list for the basic information of the cell phone that has the same account information as the PC, including a cell phone type (such as Android) and a model (such as A2), according to the identifier of the PC, the user account information and the format information of QQ Supermarket. The server then returns the basic information of the cell phone to the PC.

Figure 8B:
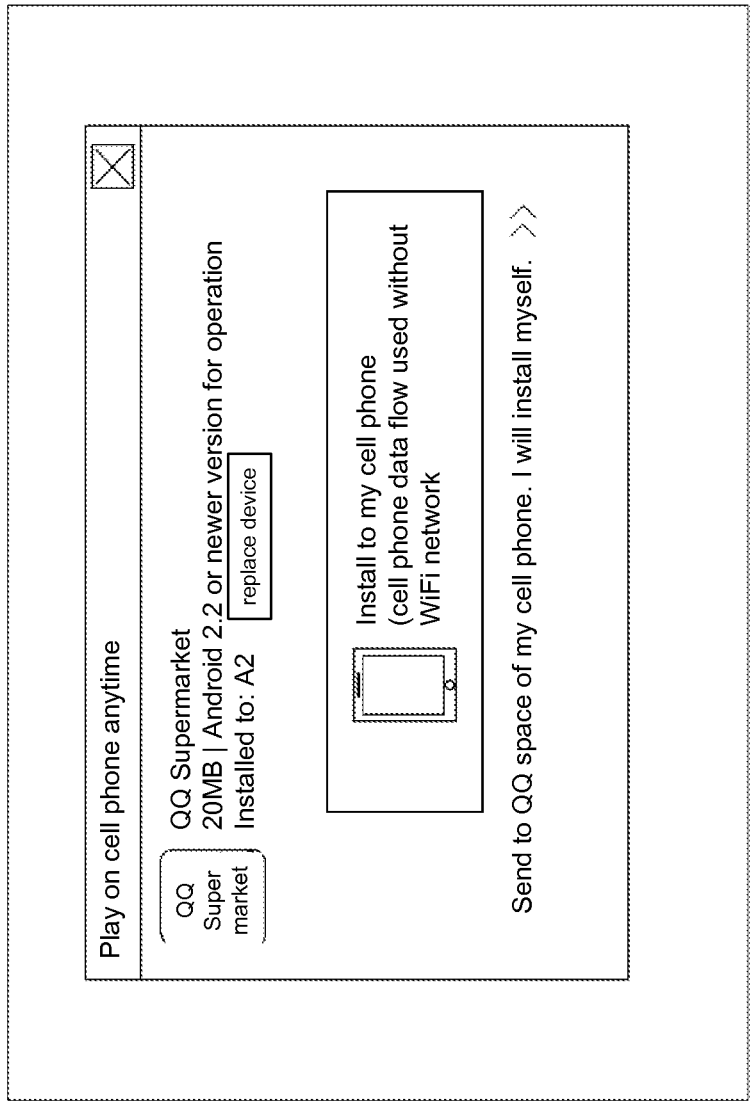
Figure 8C:
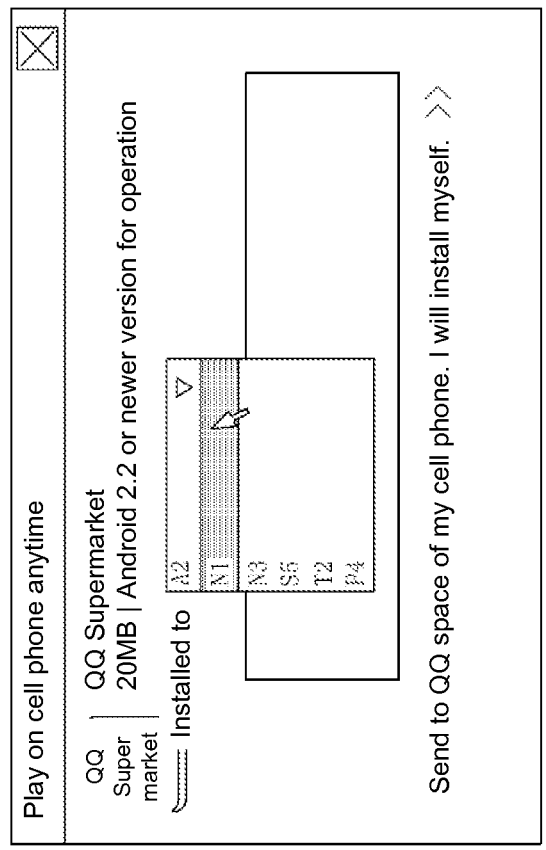

According to another embodiment, as shown in FIG. 8(B), the PC processes the installation information of QQ Supermarket and the basic information of the cell phone, displays the installation information of QQ Supermarket (such as the icon, the name, the size and a supported operating environment) and the basic information of the cell phone (such as the model) on a floating layer. For example, if the server returns the basic information of a plurality of terminals, a plurality of selection widgets corresponding to these terminals can be generated on the floating layer. For instance, the selection button shown in FIG. 8(C) is shown upon a click on the "replace device" button as shown in FIG. 8(B). As an example, each selection button corresponds to one terminal, e.g., a cell phone or a tablet, for the user to select from. As shown in FIG. 8(B) and FIG. 8(C), two sending widgets can be generated on the floating layer, such as "install to my cell phone" and "send to QQ Space of my cell phone, I will install myself," in some embodiments. For example, when the user selects a cell phone A2 and clicks "install to my cell phone," the PC sends to the server a push instruction carrying the first predefined identifier. In another example, if the user clicks on "send to QQ Space of my cell phone, I will install myself," the PC sends to the server a push instruction carrying the second predefined identifier.

Figure 8D:
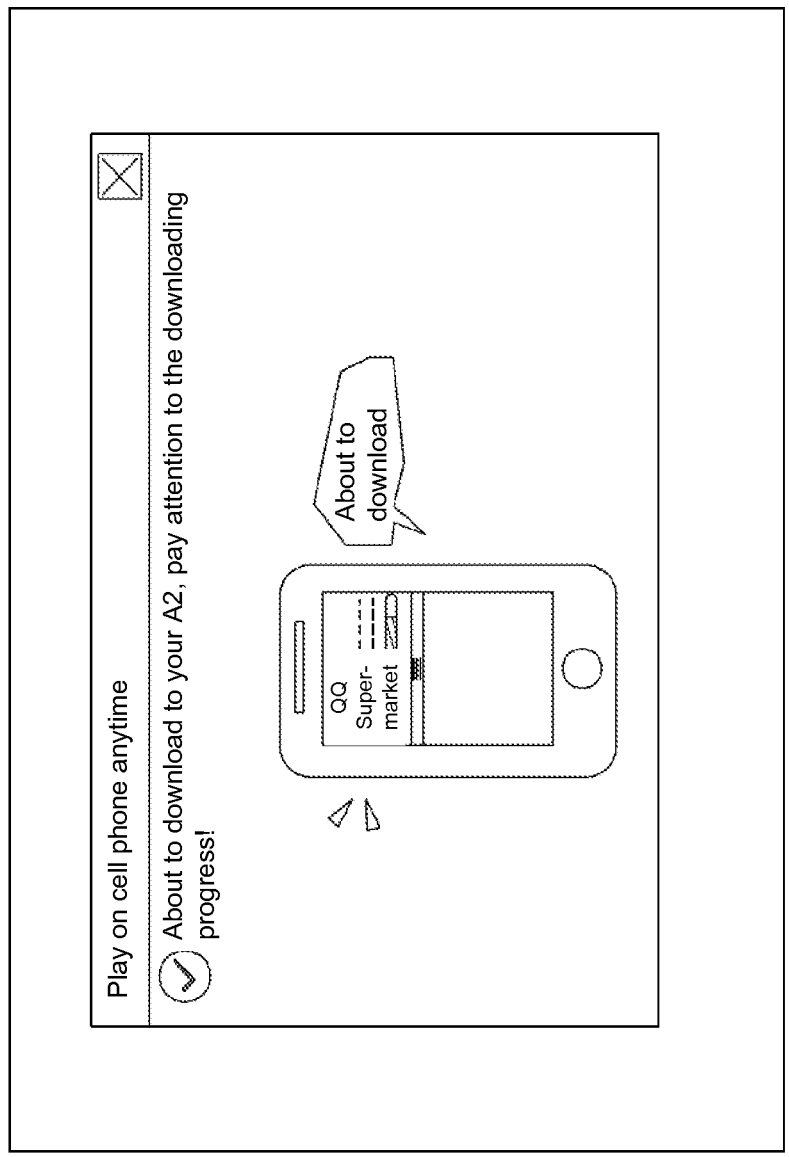

In certain embodiments, when the user clicks "install to my cell phone" and if the user chooses to install to terminal A2, the PC sends to the server a push instruction carrying the first predefined identifier, the identifier of terminal A2 and the application identifier of QQ Supermarket. For example, the PC may also generate a prompt window as shown in FIG. 8(D) to prompt the user to download QQ Supermarket to the cell phone A2 and pay attention to the download progress. In another example, after receiving the push instruction, the server acquires the basic information of the cell phone A2 via a network or reads the basic information of the cell phone A2 stored in the server. The server then determines if A2 is turned on and logged in via an account related to the PC account. For example, if A2 is turned on and logged in, the server sends to cell phone A2 the first push message which contains the installation information of QQ Supermarket and the first predefined identifier. Otherwise, cell phone A2 is not turned on or connected to the Internet, and the server downloads the installation package of QQ Supermarket to the cloud database according to the installation information of QQ Supermarket and records the new installation information of QQ Supermarket. When the basic information of cell phone A2 satisfies the predefined initial conditions for push, the server sends the new installation information to cell phone A2 (i.e., the second terminal). As an example, the cell phone A2 receives the first push message that contains the first predefined identifier from the server and installs QQ Supermarket according to the installation information of QQ Supermarket.

Figure 8E:
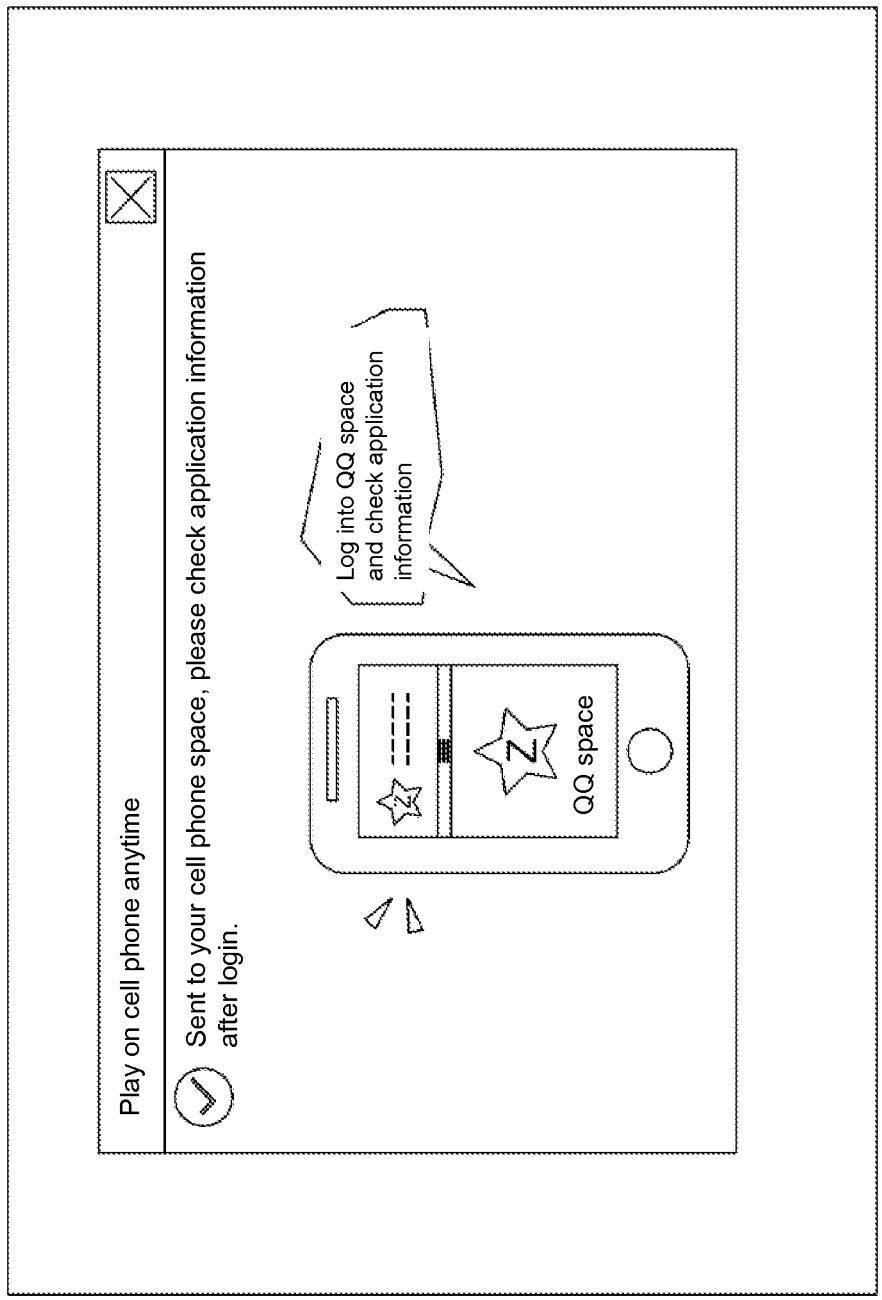
Figure 8F:
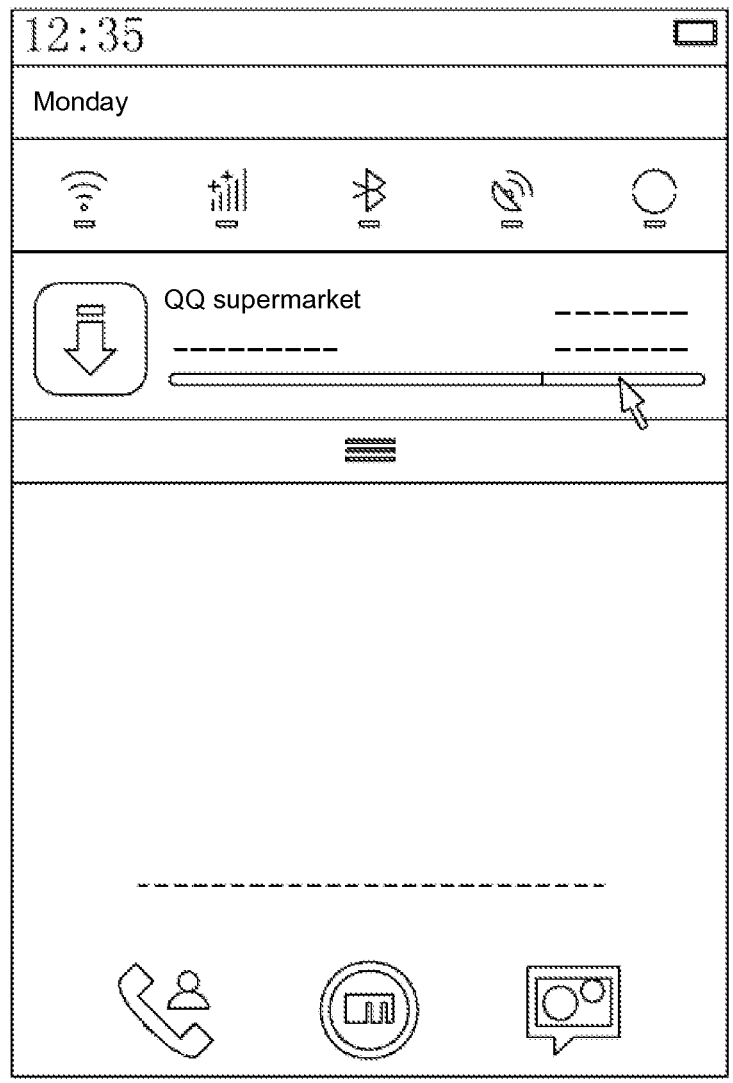
Figure 8G:
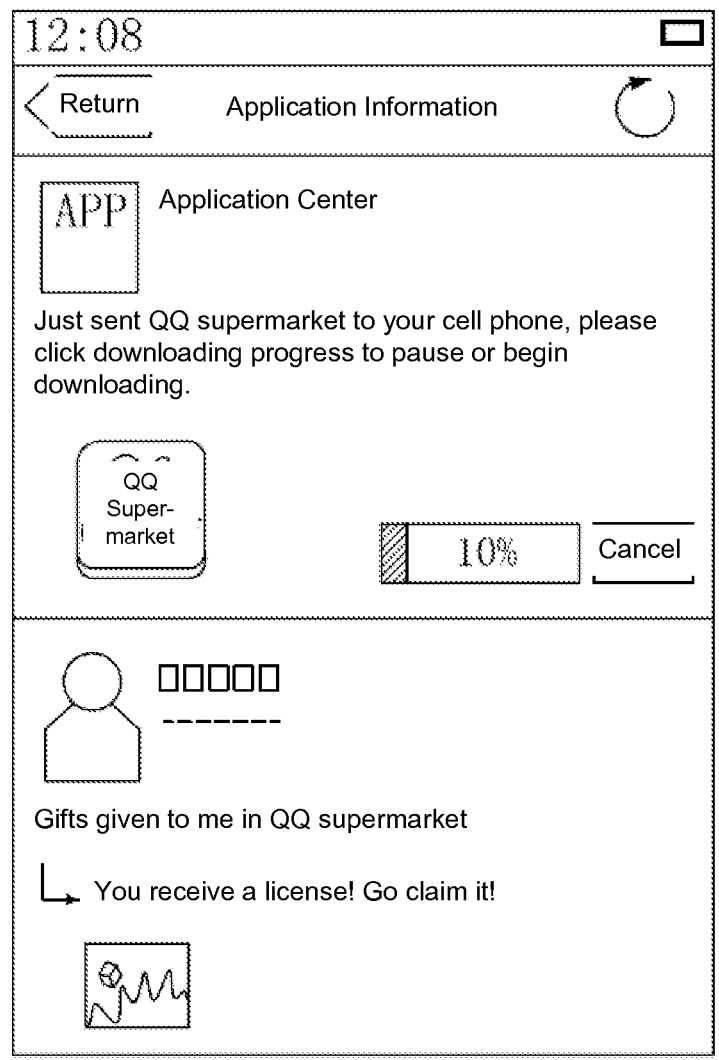
Figure 8H:
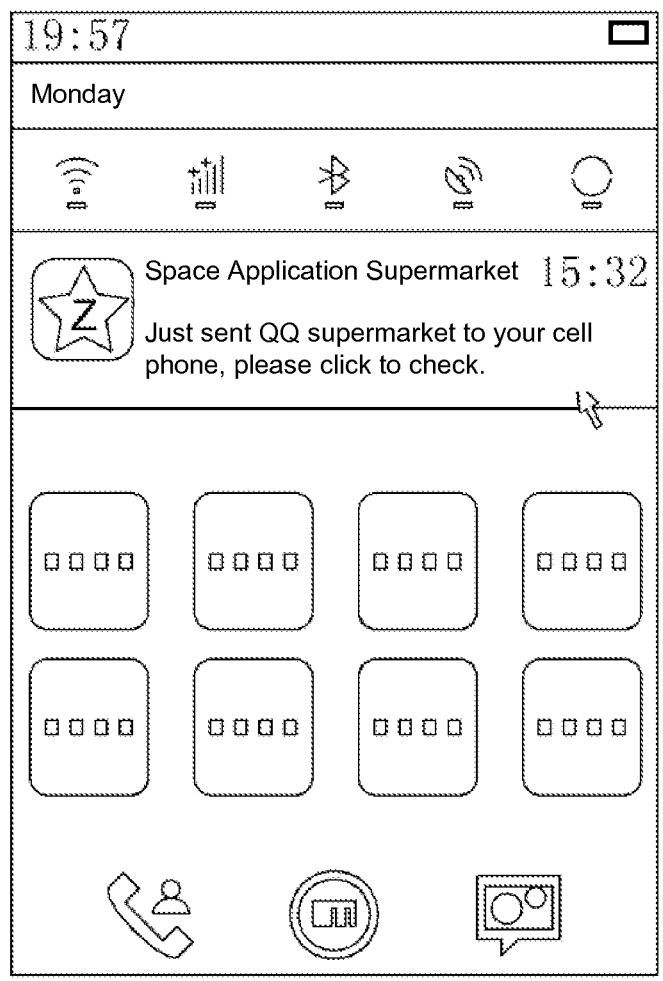
Figure 8I:
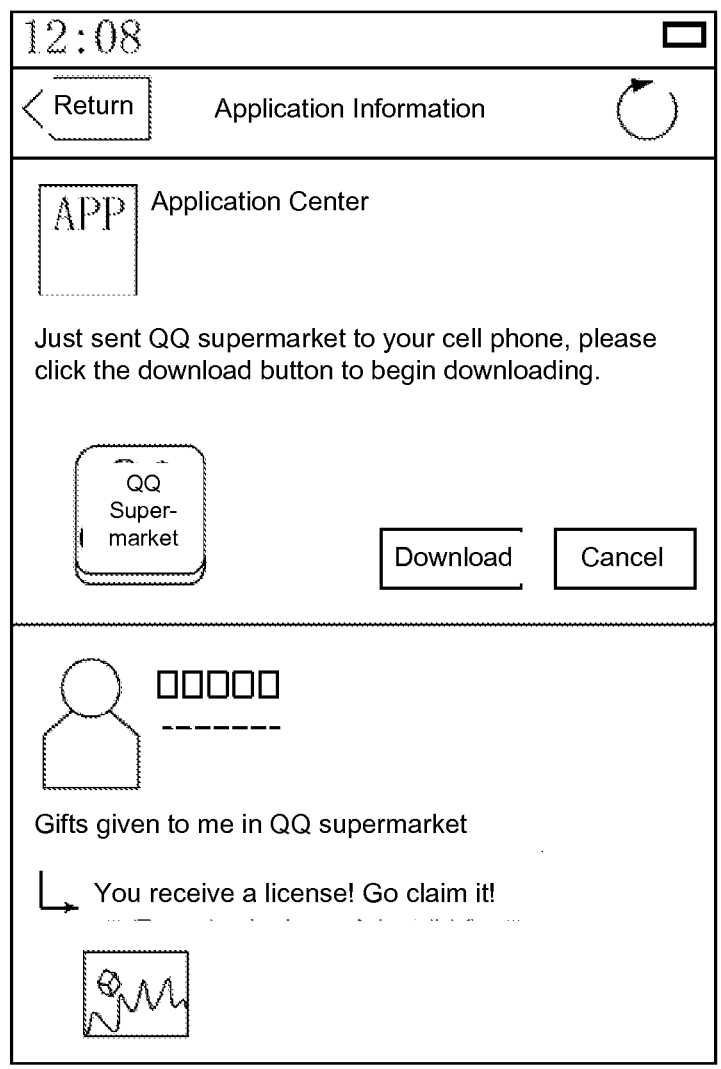

In some embodiments, as shown in FIG. 8(F) and FIG. 8(G), the user can manage the downloading process on the application message page in the cell phone. For instance, the user clicks on "send to QQ Space of my cell phone, I will install myself." If the user chooses to install the application to terminal A2, the PC sends to the server the push instruction carrying the second predefined identifier, the identifier of terminal A2 and the application identifier of QQ Supermarket. Further, the PC may also generate a prompt window as shown in FIG. 8(E) to notify the user that the installation information of QQ Supermarket has been sent to QQ Space on the cell phone and request the user to log in and check relevant messages. In certain embodiments, as shown in FIG. 8(H)-FIG. 8(I), cell phone A2 outputs the push prompt message to the user after receiving the second push message carrying the second predefined identifier from the server. For example, when the user clicks on the "download" button, cell phone A2 starts installing QQ Supermarket. In some embodiments, a computer storage medium stores a program which executes at least part of the processes in the method 100, the method 200, the method 300, the method 400, the method 500, the method 600, and/or the method 700.

Figure 9:
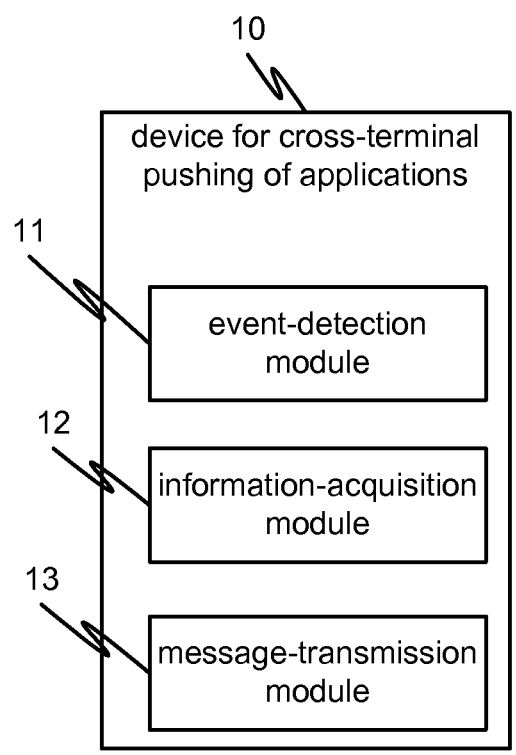
FIG. 9 is a simplified diagram showing a device for cross-terminal pushing of applications according to one embodiment of the present invention.

FIG. 9 is a simplified diagram showing a device for cross-terminal pushing of applications according to one embodiment of the present invention. This diagram is merely an example, which should not unduly limit the scope of the claims. One of ordinary skill in the art would recognize many variations, alternatives, and modifications. The device 10 includes an event-detection module 11, an information-acquisition module 12 and a message-transmission module 13.

According to one embodiment, the event-detection module 11 is configured to detect whether an application-push event in a browser opened in a first terminal is triggered. For example, the information-acquisition module 12 is configured to, in response to the event-detection module detecting that the application-push event is triggered, acquire installation information of an application corresponding to the application-push event. In another example, the message-transmission module 13 is configured to send a push instruction to a server, wherein the push instruction carries the installation information of the application, so that the server sends the installation information of the application to one or more second terminals related to the first terminal. For example, the application-push event is triggered when the user clicks on a triggering widget of the application-push event in the browser opened in the first terminal; or the user selects the application-push event in the browser opened in the first terminal. As an example, an application-push event corresponds to an application independently. The installation information of the application may contain an application identifier, and/or a download address, format information, an icon, a name, a size, a supported operating environment and a version number of the application. For example, the download address of the application includes a URL (Uniform/Universal Resource Locator) address of the application or the storage address of the application. The identifier of the application is used to uniquely identify the application. The application identifier may be an identification (ID) or a serial number of the application. The format information of the application may be used to differentiate the types of the terminals supported by the application. For example, besides the installation information of the application, the push instruction may also carry a type identifier of the push instruction. As an example, the type identifier of the push instruction includes a first predefined identifier or a second predefined identifier, where the first predefined identifier is configured to instruct the second terminals to immediately install the application and the second predefined identifier is configured to instruct the second terminals to install the application according to operations of a user.

Figure 10:
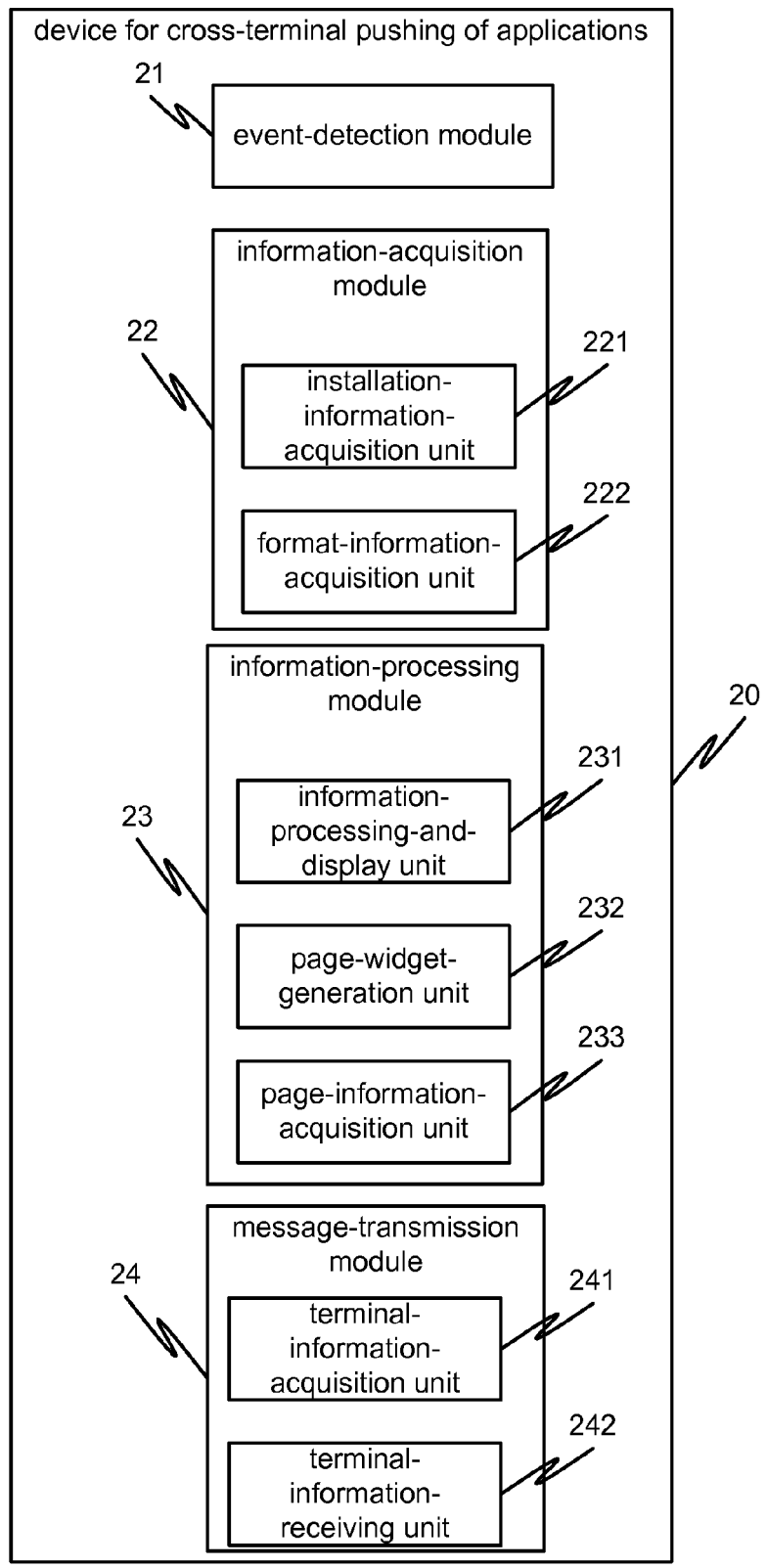
FIG. 10 is a simplified diagram showing a device for cross-terminal pushing of applications according to another embodiment of the present invention.

FIG. 10 is a simplified diagram showing a device for cross-terminal pushing of applications according to another embodiment of the present invention. This diagram is merely an example, which should not unduly limit the scope of the claims. One of ordinary skill in the art would recognize many variations, alternatives, and modifications. The device 20 includes an event-detection module 21, an information-acquisition module 22, an information-processing module 23 and a message-transmission module 24.

According to one embodiment, the event-detection module 21 is configured to detect whether an application-push event in a browser opened in a first terminal is triggered. For example, the information-acquisition module 22 is configured to, in response to the event-detection module detecting that the application-push event is triggered, acquire installation information of an application corresponding to the application-push event. In another example, the message-transmission module 23 is configured to send a push instruction to a server, wherein the push instruction carries the installation information of the application, so that the server sends the installation information of the application to one or more second terminals related to the first terminal. In yet another example, the installation information of the application acquired by the information-acquisition module 22 also includes the format information of the application. In yet another example, the application may be in different formats and different types of terminals can only be installed with the applications of which the formats the terminals support. For instance, the application formats supported by a terminal that uses an iOS system include ipa, pxl and deb. In another example, the application formats supported by a terminal that uses an Android system include apk. In yet another example, the application formats supported by a terminal that uses a S60 system include sis and sisx. In yet another example, the application formats supported by a terminal that uses a Windows system include xap. In yet another example, each format has a corresponding download address, and the installation information of the application may include the application identifier, the download address and/or the format information of the application as well as the download address of each format.

According to another embodiment, the information-processing module 23 includes an information-processing-and-display unit 231, a page-widget-generation unit 232 and a page-information-acquisition unit 233. For example, the information-processing-and-display unit 231 is configured to process the installation information of the application and the basic information of the second terminals returned by the server and display the processed installation information of the application and the processed basic information of the second terminals in a floating layer. In another example, the page-widget-generation unit 232 is configured to generate a push-instruction-sending widget on the floating layer. In yet another example, the page-information-acquisition unit 233 is configured to acquire layer information of the floating layer and send the layer information to the message-transmission module 24.

According to yet another embodiment, the information transmission module 24 includes a terminal-information-acquisition unit 241 and a terminal-information-receiving unit 242. For example, the terminal-information-acquisition unit 241 is configured to send a terminal-information-acquisition message to the server, where the terminal-information-acquisition message carries an identifier of the first terminal, first account information of the first terminal and the format information of the application, so that the server searches in an account list for basic information of the second terminals based on at least information associated with the first account information of the first terminal, the second terminals including a second account related to the first terminal and matching with the format information of the application. In another example, the terminal-information-receiving unit 242 is configured to receive the basic information of the second terminals returned by the server. In yet another example, the push-instruction-sending widget includes a first sending widget and a second sending widget. In yet another example, the event-detection module 21 is also configured to detect if the first sending widget or the second sending widget is triggered. In yet another example, the message-transmission module 24 is further configured to, upon detection of the first sending widget being triggered, send to the server the push instruction carrying a first predefined identifier; and upon detection of the second sending widget being triggered, send to the server the push instruction carrying a second predefined identifier.

In one embedment, the page-widget-generation unit 232 in the information-processing module 23 is also configured to, in response to the basic information of the second terminals received by the terminal-information-receiving unit 241 containing relevant information of a plurality of second terminals, generate a plurality of selection widgets corresponding to the plurality of second terminals are generated on the floating layer for a user to select from. For example, the page-information-acquisition unit 233 is also configured to acquire an identifier of one of the plurality of second terminals selected by the user and send the identifier of the one of the plurality of second terminals to the message-transmission module 24. In another example, the push instruction further carries an identifier of the second terminals selected by the user so that the server sends the installation information of the application to the second terminals with the identifier according to the identifier of the second terminals in the push instruction.

Figure 11:
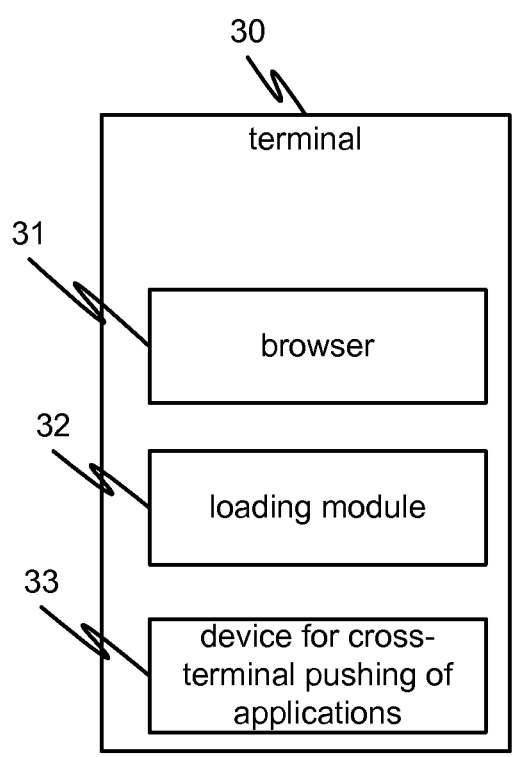
FIG. 11 is a simplified diagram showing a terminal for cross-terminal pushing of applications according to one embodiment of the present invention.

FIG. 11 is a simplified diagram showing a terminal for cross-terminal pushing of applications according to one embodiment of the present invention. This diagram is merely an example, which should not unduly limit the scope of the claims. One of ordinary skill in the art would recognize many variations, alternatives, and modifications. The terminal 30 is installed with a browser 31 and includes a loading module 32 and a device for cross-terminal application push 33. In some embodiments, the device 33 is the same as the device 10 or the device 20. The loading module 32 is configured to load the device for cross-terminal application push 33 in the browser 31, in certain embodiments. For example, the terminal 30 corresponds to the first terminal described for FIG. 1-FIG. 7.

Figure 12:
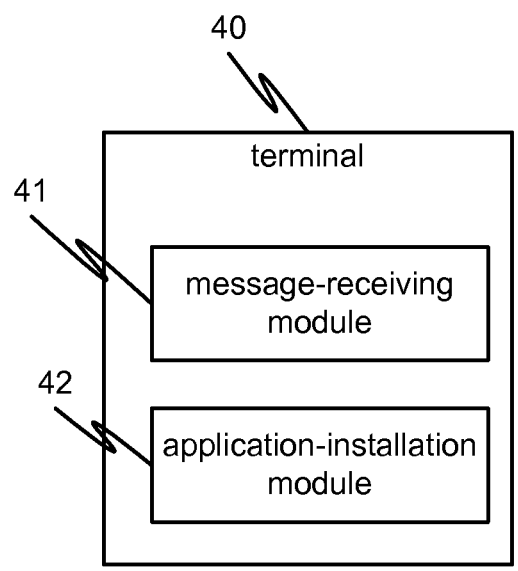
FIG. 12 is a simplified diagram showing a terminal for cross-terminal pushing of applications according to another embodiment of the present invention.

FIG. 12 is a simplified diagram showing a terminal for cross-terminal pushing of applications according to another embodiment of the present invention. This diagram is merely an example, which should not unduly limit the scope of the claims. One of ordinary skill in the art would recognize many variations, alternatives, and modifications. The terminal 40 includes a message-receiving module 41 and an application-installation module 42. For example, the terminal 40 corresponds to a second terminal described for FIG. 1-FIG. 7.

According to one embodiment, the message-receiving module 41 is configured to receive a push message sent by a server, wherein the push message that carries installation information of an application is sent to the server by a second terminal related to the first terminal and the application corresponds to an application-push event triggered in a browser opened in the second terminal. For example, the application-installation module 42 is configured to install the application according to the installation information of the application. In another example, after user login via certain account information upon startup of the second terminals, message-receiving module 41 starts to receive the installation information of the application sent from the server. As an example, the account information which the user uses for login of the second terminals (e.g., the account information of the second terminals) is related to the account information which the user uses for login of the first terminal (e.g., the account information of the first terminal). In another example, both the second terminals and the first terminal are owned by a user, and the account information stored on the first terminal and the account information stored on the second terminals are the same. In yet another example, the second terminals may be owned by a friend of the user, and the account information stored on the first terminal has established a user relation with the account information stored on the second terminals, where the relation is recorded in the account list.

According to another embodiment, after the message-receiving module 41 receives the installation information of the application, the application-installation module 42 can install the application according to the installation information of the application. For example, if the installation information of the application contains the application identifier and a download address of the application, the second terminals determine if the application corresponding to the application identifier has been installed on the second terminals according to the application identifier. If the application is not installed on the second terminals and the installation information of the application contains the download address of the application, the second terminals can download the installation package of the application according to the download address and install the application. In another example, if the installation information of the application contains the application identifier and the second terminals find that the application is not installed on the second terminals according to the application identifier, the second terminals send a download request message to the server, where the download request message carries the application identifier of the application and the terminal type of the second terminal.

According to yet another embodiment, the server receives the download request message, acquires the installation package of the application according to the application identifier and the terminal type carried in the download request message and sends the installation package of the application to the second terminal. The second terminals receive the installation package of the application and install the application. Specifically, the server determines the formats of applications supported by the second terminals according to the terminal type of the second terminal, acquires the corresponding download address from the correspondence among the stored application identifier, the application format and the download address according to the stored application identifier and the application formats supported by the second terminal, and acquires the installation package of the application according to the download address. In yet another example, the server stores a correspondence between the terminal type and the application format beforehand so that the server can acquire the corresponding application format from the stored correspondence between the terminal type and the application format according to the terminal type of the second terminal. The acquired application formats are supported by the second terminals.

In one embodiment, the server determines the application formats supported by the second terminals according to the terminal type of the second terminals and acquires the corresponding application identifier and the application format from the correspondence among the stored application identifier, the application format and the download address according to the download address. For example, if the application format is among the formats supported by the second terminals, the server acquires the installation package of the application according to the download address. Otherwise, the server acquires the corresponding download address from the correspondence between the stored application identifier, the application format and the download address according to the application identifier and the application formats supported by the second terminals and acquires the installation package of the application according to the download address.

Figure 13:
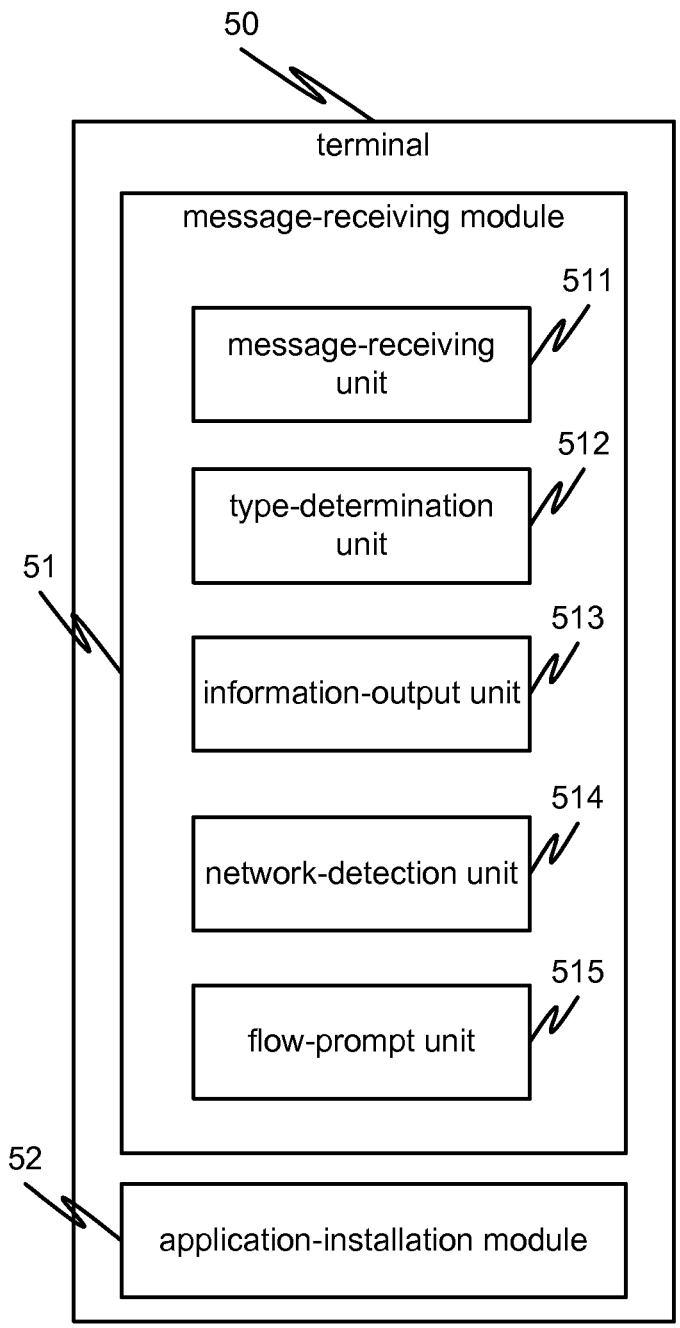
FIG. 13 is a simplified diagram showing a terminal for cross-terminal pushing of applications according to yet another embodiment of the present invention.

FIG. 13 is a simplified diagram showing a terminal for cross-terminal pushing of applications according to yet another embodiment of the present invention. This diagram is merely an example, which should not unduly limit the scope of the claims. One of ordinary skill in the art would recognize many variations, alternatives, and modifications. The terminal 50 includes a message-receiving module 51 and an application-installation module 52. In one embodiment, the message-receiving module 51 includes a message-receiving unit 511, a type-determination unit 512, an information-output unit 513, a network detection unit 514 and a flow-prompt unit 515. For example, the terminal 50 corresponds to a second terminal as described for FIG. 1-FIG. 7.

According to one embodiment, the message-receiving unit 511 is configured to receive a push message. For example, the type-determination unit 512 is configured to determine a type of the push message. In another example, the information-output unit 513 is configured to output a push prompt message to a user. In yet another example, if the type-determination unit 512 determines that a first push message containing a first predefined identifier is received, an application-installation module installs the application according to the installation information of the application. In yet another example, if the type-determination unit 512 determines that a second push message containing a second predefined identifier is received, the information-output unit 513 outputs a push prompt message to a user and the application-installation module installs the application according to the user operation and the installation information of the application. In yet another example, the network-detection unit 514 is configured to detect if a network environment is Wi-Fi environment. If the network-detection unit 514 detects that the network environment does not include a Wi-Fi environment, the flow-prompt unit 515 is configured to output a flow-prompt message to the user to prompt the user that continuing to install the application consume data flow and pop up a selection window for the user to choose whether to continue the installation or not.

Figure 14:
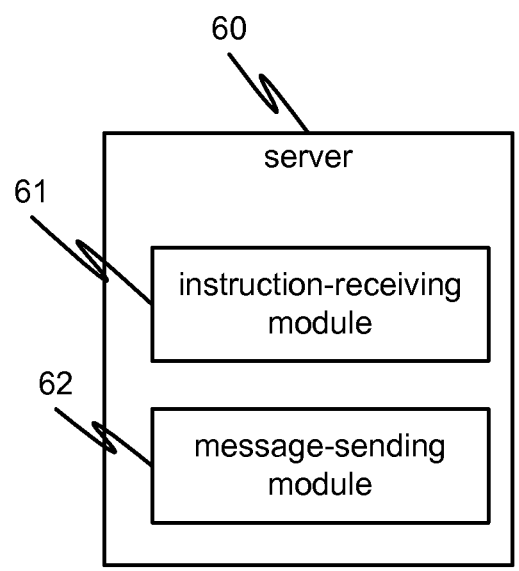
FIG. 14 is a simplified diagram showing a server for cross-terminal pushing of applications according to one embodiment of the present invention.

FIG. 14 is a simplified diagram showing a server for cross-terminal pushing of applications according to one embodiment of the present invention. This diagram is merely an example, which should not unduly limit the scope of the claims. One of ordinary skill in the art would recognize many variations, alternatives, and modifications. The server 60 includes an instruction-receiving module 61 and a message-sending module 62.

According to one embodiment, the instruction-receiving module 61 is configured to receive a push instruction from a first terminal, where the push instruction carries installation information of an application and the application is the application corresponding to an application-push event triggered in a browser opened in the first terminal. For example, the message-sending module 62 is configured to send an application-push message to one or more second terminals related to the first terminal, where the application-push message contains the installation information of the application, so that the second terminals install the application according to the installation information of the application.

Figure 15:
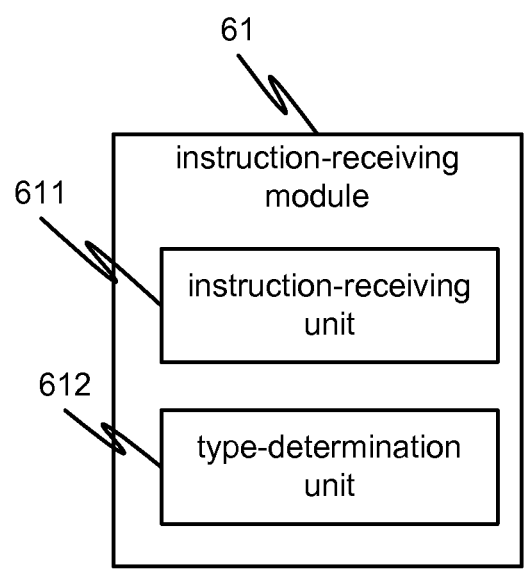
FIG. 15 is a simplified diagram showing an instruction-receiving module as part of the server as shown in FIG. 14 according to one embodiment of the present invention.

FIG. 15 is a simplified diagram showing the instruction-receiving module 61 as part of the server 60 for cross-terminal pushing of applications according to one embodiment of the present invention. This diagram is merely an example, which should not unduly limit the scope of the claims. One of ordinary skill in the art would recognize many variations, alternatives, and modifications. The instruction-receiving module 61 includes an instruction-receiving unit 611 and a type-determination unit 612.

According to one embodiment, the instruction-receiving unit 611 is configured to receive the push instruction. For example, the type-determination unit 612 is configured to determine whether the type identifier in the push instruction is a first predefined identifier or a second predefined identifier. In another example, the message-sending module 62 sends a first push message to the second terminals related to the first terminal if the type identifier is the first predefined identifier, where the first push message contains the installation information of the application and the first predefined identifier. In yet another example, the message-sending module 62 sends a second push message to the second terminals related to the first terminal if the type identifier is the second predefined identifier, where the second push message contains the installation information of the application and the second predefined identifier.

Figure 16:
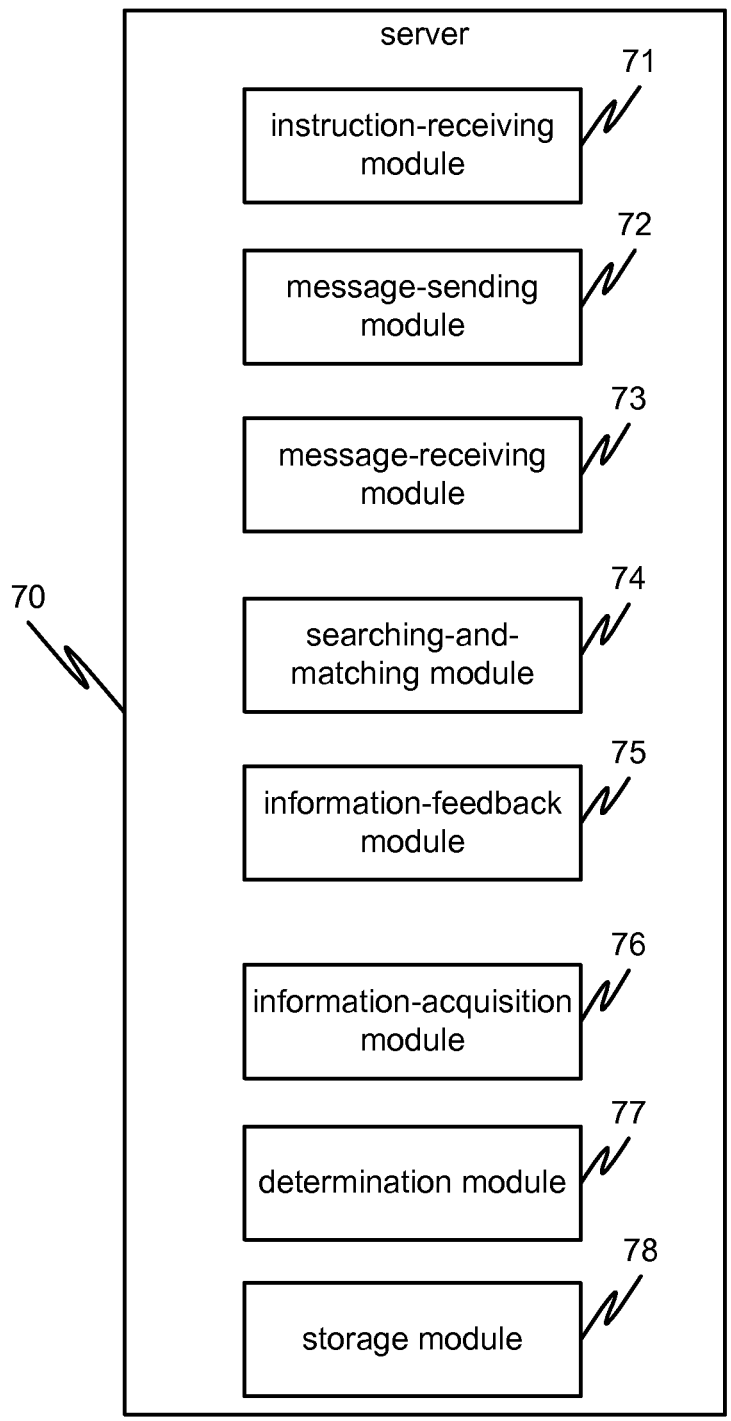
FIG. 16 is a simplified diagram showing a server for cross-terminal pushing of applications according to another embodiment of the present invention.

FIG. 16 is a simplified diagram showing a server for cross-terminal pushing of applications according to another embodiment of the present invention. This diagram is merely an example, which should not unduly limit the scope of the claims. One of ordinary skill in the art would recognize many variations, alternatives, and modifications. The server 70 includes an instruction-receiving module 71, a message-sending module 72, a message-receiving module 73, a searching-and-matching module 74 and an information-feedback module 75.

According to one embodiment, the message-receiving module 72 is configured to receive a terminal-information-acquisition message sent from the first terminal, where the terminal-information-acquisition message carries an identifier and account information of the first terminal and the format information of the application. For example, the searching-and-matching module 73 is configured to search an account list for basic information of the second terminals which has an account related to the first terminal and matches the format information of the application according to the account information of the first terminal in the terminal-information-acquisition message. In another example, the information-feedback module 75 is configured to return to the first terminal the basic information of the second terminals which has an account related to the first terminal.

According to another embodiment, the server 70 further includes an information-acquisition module 76, a determination module 77 and a storage module 78. For example, the information-acquisition module 76 is configured to acquire the basic information of the second terminal; the determination module is configured to determine if the basic information of the second terminals satisfies predetermined push conditions. As an example, if the basic information of the second terminals satisfies predetermined push conditions, the message-sending module 72 sends the installation information of the application to the second terminals related to the first terminal. In another example, if the basic information of the second terminals does not satisfy predetermined push conditions, the storage module 78 downloads an installation package of the application to a cloud database according to the installation information of the application and records new installation information of the application. In yet another example, when the determination module 77 determines that the basic information of the second terminals satisfies the predetermined push conditions, the message-sending module 72 sends the new installation information of the application to the second terminals. In yet another example, the initial conditions for push include that the second terminals are turned on and have used an account the same as or related to the account of the first terminal.

Figure 17:
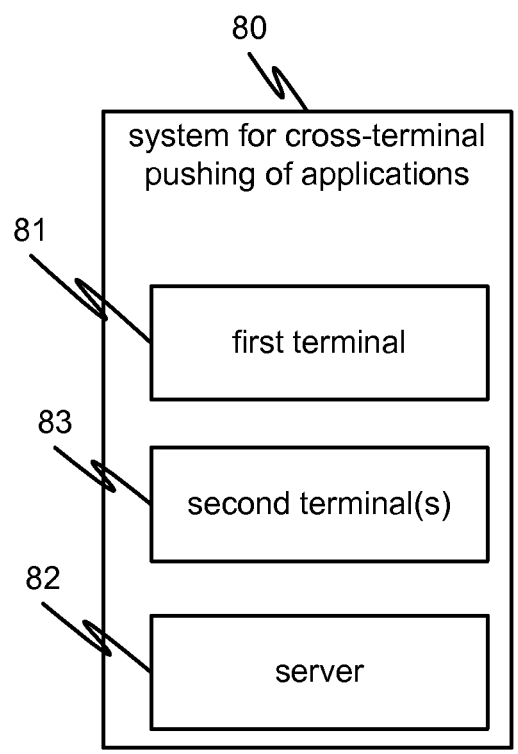
FIG. 17 is a simplified diagram showing a system for cross-terminal pushing of applications according to one embodiment of the present invention.

FIG. 17 is a simplified diagram showing a system for cross-terminal pushing of applications according to one embodiment of the present invention. This diagram is merely an example, which should not unduly limit the scope of the claims. One of ordinary skill in the art would recognize many variations, alternatives, and modifications. The system 80 includes a first terminal 81, a server 82 and one or more second terminals 83. According to one embodiment, the first terminal 81 is the same as the terminal 30, the terminal 40, or the terminal 50. For example, the server 82 is the same as the server 60 or the server 70. In another example, the one or more second terminals include the terminal 30, the terminal 40, and/or the terminal 50.

In some embodiments, the first terminal and the second terminals described above include: PCs, tablets, cell phones, electronic readers, laptops, smart TV, set-top boxes and vehicle-mounted terminals, or any other suitable devices. For example, the first terminal may be a terminal of any type installed with a browser for browsing Internet pages and searching for application information. As an example, the first terminal includes a loading module for loading in the browser a device for cross-terminal pushing of applications (e.g., the device 10 or the device 20). In another example, the second terminals may be a terminal of any type, e.g., a mobile terminal. In certain embodiments, the first terminal and the second terminals can be connected directly via a communication network. For example, the first terminal and the second terminals can establish communication in a Wi-Fi (wireless fidelity) network, a 2G/3G network or a local area network. In another example, the second terminals related to the first terminal have a same account as the first terminal or the second terminals correspond to an account that has a user relation, such as a social-networking-services (SNS) user relation, with the account of the first terminal. In some embodiments, the account includes a user account of a browser or an application of the first terminal or the second terminals, such as a user login account information of an instant messaging application in the first terminal or the second terminals. For example, upon first use of the account information, the first terminal or the second terminals report the account information and the basic information of the terminal(s) to the server and the server records such information in an account list which records the basic information of all terminals corresponding to each account. The basic information of a terminal includes an identifier, a terminal type and other data of the terminal. The account list further records the user relation between accounts.

According to one embodiment, a method is provided for cross-terminal pushing of applications. For example, installation information of an application corresponding to an application-push event in a browser opened in a first terminal is acquired upon detection of the application-push event being triggered; the first terminal sends a push instruction to a server, the push instruction carrying the installation information of the application; the server sends the installation information of the application to one or more second terminals related to the first terminal; the second terminals send the installation information of the application; and the second terminals install the application based on at least information associated with the installation information of the application. For example, the method is implemented according to at least FIG. 1, FIG. 2, FIG. 3, FIG. 4, FIG. 5, FIG. 6, FIG. 7(A), and/or FIG. 7(B).

According to another embodiment, a method is provided for cross-terminal pushing of applications. For example, installation information of an application corresponding to an application-push event in a browser opened in a first terminal is acquired upon detection of the application-push event being triggered; and the first terminal sends a push instruction that carries the installation information of the application to a server, so that the server sends the installation information of the application to one or more second terminals related to the first terminal and the second terminals install the application based on at least information associated with the installation information of the application. For example, the method is implemented according to at least FIG. 1, FIG. 2, FIG. 3, FIG. 4, FIG. 5, FIG. 6, FIG. 7(A), and/or FIG. 7(B).

According to yet another embodiment, a method is provided for cross-terminal pushing of applications. For example, a server receives a push instruction from a first terminal, where the push instruction carries installation information of an application corresponding to an application-push event being triggered in a browser opened in the first terminal; and the server sends the installation information of the application to one or more second terminals related to the first terminal so that the second terminals install the application based on at least information associated with the installation information of the application. For example, the method is implemented according to at least FIG. 1, FIG. 2, FIG. 3, FIG. 4, FIG. 5, FIG. 6, FIG. 7(A), and/or FIG. 7(B).

According to yet another embodiment, a method is provided for cross-terminal pushing of applications. For example, one or more second terminals receive installation information of an application from a server and install the application based on at least information associated with the installation information of the application. The installation information of the application is sent to the server by a first terminal related to the second terminals and the application corresponds to an application-push event being triggered in a browser opened in the first terminal. For example, the method is implemented according to at least FIG. 1, FIG. 2, FIG. 3, FIG. 4, FIG. 5, FIG. 6, FIG. 7(A), and/or FIG. 7(B).

In one embodiment, a device for cross-terminal pushing of applications includes: an event-detection module configured to detect whether an application-push event in a browser opened in a first terminal is triggered, an information-acquisition module configured to, in response to the event-detection module detecting that the application-push event is triggered, acquire installation information of an application corresponding to the application-push event, and a message-transmission module configured to send a push instruction to a server, wherein the push instruction carries the installation information of the application, so that the server sends the installation information of the application to one or more second terminals related to the first terminal. For example, the device is implemented according to at least FIG. 9 and/or FIG. 10.

In another embodiment, a first terminal installed with a browser includes: a loading module configured to load a device for cross-terminal pushing of applications in the browser. The device includes: an event-detection module configured to detect whether an application-push event is triggered; an information-acquisition module configured to, in response to the event-detection module detecting that the application-push event is triggered, acquire installation information of an application corresponding to the application-push event; and a message-transmission module configured to send a push instruction to a server, wherein the push instruction carries the installation information of the application, so that the server sends the installation information of the application to one or more second terminals. For example, the first terminal is implemented according to at least FIG. 11, FIG. 12, and/or FIG. 13.

In yet another embodiment, a device for cross-terminal pushing of applications operating on a first terminal includes: a message-receiving module configured to receive a push message sent by a server, wherein the push message that carries installation information of an application is sent to the server by a second terminal related to the first terminal and the application corresponds to an application-push event triggered in a browser opened in the second terminal; and an application-installation module configured to install the application according to the installation information of the application. For example, the device is implemented according to at least FIG. 11, FIG. 12, and/or FIG. 13.

In yet another embodiment, a device for cross-terminal pushing of applications operating on a server includes: an instruction-receiving module configured to receive a push instruction from a first terminal, wherein the push instruction carries installation information of an application corresponding to an application-push event triggered in a browser opened in the first terminal; and a message-sending module configured to send an application-push message to one or more second terminals related to the first terminal, wherein the application-push message contains the installation information of the application, so that the second terminals install the application based on at least information associated with the installation information of the application. For example, the device is implemented according to at least FIG. 14 and/or FIG. 16.

According to one embodiment, a system for cross-terminal pushing of applications includes: a first terminal, one or more second terminals and a server. The first terminal installed with a browser includes: a loading module configured to load a first device in the browser. The first device includes: an event-detection module configured to detect whether an application-push event is triggered; an information-acquisition module configured to, in response to the event-detection module detecting that the application-push event is triggered, acquire installation information of an application corresponding to the application-push event; and a message-transmission module configured to send a push instruction to a server, wherein the push instruction carries the installation information of the application, so that the server sends the installation information of the application to one or more second terminals. A second device that operates on the one or more second terminals includes: a message-receiving module configured to receive a push message sent by the server, wherein the push message that carries installation information of an application is sent to the server by the first terminal related to the second terminals and the application corresponds to an application-push event triggered in a browser opened in the first terminal; and an application-installation module configured to install the application according to the installation information of the application. A third device that operates on the server includes: an instruction-receiving module configured to receive a push instruction from a first terminal, wherein the push instruction carries installation information of an application corresponding to an application-push event triggered in a browser opened in the first terminal; and a message-sending module configured to send an application-push message to one or more second terminals related to the first terminal, wherein the application-push message contains the installation information of the application, so that the second terminals install the application based on at least information associated with the installation information of the application. For example, the system is implemented according to at least FIG. 17.

According to another embodiment, a non-transitory computer readable storage medium includes programming instructions for cross-terminal pushing of applications. The programming instructions configured to cause one or more data processors to execute certain operations. For example, installation information of an application corresponding to an application-push event in a browser opened in a first terminal is acquired upon detection of the application-push event being triggered; the first terminal sends a push instruction to a server, the push instruction carrying the installation information of the application; the server sends the installation information of the application to one or more second terminals related to the first terminal; the second terminals send the installation information of the application; and the second terminals install the application based on at least information associated with the installation information of the application. For example, the storage medium is implemented according to at least FIG. 1, FIG. 2, FIG. 3, FIG. 4, FIG. 5, FIG. 6, FIG. 7(A), and/or FIG. 7(B).

According to yet another embodiment, a non-transitory computer readable storage medium includes programming instructions for cross-terminal pushing of applications. The programming instructions configured to cause one or more data processors to execute certain operations. For example, installation information of an application corresponding to an application-push event in a browser opened in a first terminal is acquired upon detection of the application-push event being triggered; and the first terminal sends a push instruction that carries the installation information of the application to a server, so that the server sends the installation information of the application to one or more second terminals related to the first terminal and the second terminals install the application based on at least information associated with the installation information of the application. For example, the storage medium is implemented according to at least FIG. 1, FIG. 2, FIG. 3, FIG. 4, FIG. 5, FIG. 6, FIG. 7(A), and/or FIG. 7(B).

In one embodiment, a non-transitory computer readable storage medium includes programming instructions for cross-terminal pushing of applications. The programming instructions configured to cause one or more data processors to execute certain operations. For example, a server receives a push instruction from a first terminal, where the push instruction carries installation information of an application corresponding to an application-push event being triggered in a browser opened in the first terminal; and the server sends the installation information of the application to one or more second terminals related to the first terminal so that the second terminals install the application based on at least information associated with the installation information of the application. For example, the storage medium is implemented according to at least FIG. 1, FIG. 2, FIG. 3, FIG. 4, FIG. 5, FIG. 6, FIG. 7(A), and/or FIG. 7(B).

In another embodiment, a non-transitory computer readable storage medium includes programming instructions for cross-terminal pushing of applications. The programming instructions configured to cause one or more data processors to execute certain operations. For example, one or more second terminals receive installation information of an application from a server and install the application based on at least information associated with the installation information of the application. The installation information of the application is sent to the server by a first terminal related to the second terminals and the application corresponds to an application-push event being triggered in a browser opened in the first terminal. For example, the storage medium is implemented according to at least FIG. 1, FIG. 2, FIG. 3, FIG. 4, FIG. 5, FIG. 6, FIG. 7(A), and/or FIG. 7(B).

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for cross-terminal pushing of applications, the method comprising:
   acquiring installation information of an application corresponding to an application-push event in a browser opened in a first terminal upon detection of the application-push event being triggered; and
   sending, by the first terminal, a push instruction that carries the installation information of the application to a server, so that the server sends the installation information of the application to one or more second terminals related to the first terminal and the one or more second terminals install the application based on at least information associated with the installation information of the application, wherein:
   the installation information of the application includes format information of the application; and
   the method further includes:
      sending, by the first terminal, a terminal-information-acquisition message to the server, wherein the terminal-information-acquisition message carries an identifier of the first terminal, first account information of the first terminal and the format information of the application; wherein the server searches in an account list for basic information of the one or more second terminals based on at least information associated with the first account information of the first terminal, the one or more second terminals including a second account related to the first terminal and matching with the format information of the application; and
   receiving, by the first terminal, the basic information of the one or more second terminals, the method further comprising:
   processing, by the first terminal, the installation information of the application and the basic information of the one or more second terminals;
   displaying the processed installation information of the application and the processed basic information of the one or more second terminals in a floating layer;
   generating, by the first terminal, a push-instruction-sending widget on the floating layer; and
   upon detection of the push-instruction-sending widget being triggered, sending the push instruction to the server.

2. The method of claim 1, further comprising:
   generating a first sending widget and a second sending widget upon detection of the application-push event being triggered,
   upon detection of the first sending widget being triggered, sending, by the first terminal, to the server the push instruction carrying a first predefined identifier; and
   upon detection of the second sending widget being triggered, sending, by the first terminal, to the server the push instruction carrying a second predefined identifier.

3. The method of claim 1, wherein in response to the basic information of the one or more second terminals returned by the server containing relevant information of a plurality of second terminals, a plurality of selection widgets corresponding to the plurality of second terminals are generated on the floating layer for a user to select from.

4. The method of claim 3, wherein:
   the push instruction further carries an identifier of one of the plurality of second terminals selected by the user; and
   the server sends the installation information of the application to the one of the plurality of second terminals selected by the user.

5. The method of claim 1, wherein the one or more second terminals related to the first terminal have a same account as the first terminal, or the one or more second terminals correspond to a second account that has a user relation with a first account associated with the first terminal.

6. A method for cross-terminal pushing of applications, the method comprising:
   receiving, by a server, a push instruction from a first terminal;
   wherein the push instruction carries installation information of an application corresponding to an application-push event being triggered in a browser opened in the first terminal; and
   sending, by the server, the installation information of the application to one or more second terminals related to the first terminal so that the one or more second terminals install the application based on at least information associated with the installation information of the application, wherein:

the first terminal generates a first sending widget and a second sending widget upon detection of the application-push event being triggered;
upon detection of the first sending widget being triggered, the first terminal sends to the server the push instruction carrying a first predefined identifier;
upon detection of the second sending widget being triggered, the first terminal sends to the server the push instruction carrying a second predefined identifier;
wherein the sending, by the server, the installation information of the application to the one or more second terminals related to the first terminal includes:
receiving, by the server, the push instruction;
determining whether the push instruction includes the first predefined identifier or the second predefined identifier;
in response to the push instruction including the first predefined identifier, sending, by the server, a first push message to the one or more second terminals related to the first terminal, the first push message containing the installation information of the application and the first predefined identifier; and
in response to the push instruction including the second predefined identifier, sending, by the server, a second push message to the one or more second terminals related to the first terminal, the second push message containing the installation information of the application and the second predefined identifier.

7. The method of claim 6, further comprising:
acquiring, by the server, basic information of the one or more second terminals;
determining whether the basic information satisfies one or more predetermined push conditions;
in response to the basic information satisfying the one or more predetermined push conditions, sending, by the server, the installation information of the application to the one or more second terminals related to the first terminal; and
in response to the basic information not satisfying the one or more predetermined push conditions,
downloading an installation package of the application to a cloud database based on at least information associated with the installation information of the application;
recording new installation information of the application; and
sending the new installation information of the application to the one or more second terminals when the basic information of the one or more second terminals satisfies the predetermined push conditions.

8. A method for cross-terminal pushing of applications, the method comprising:
receiving, by one or more second terminals, installation information of an application from a server; and
installing, by the one or more second terminals, the application based on at least information associated with the installation information of the application;
wherein the installation information of the application is sent to the server by a first terminal related to the one or more second terminals and the application corresponds to an application-push event being triggered in a browser opened in the first terminal, wherein:
the server acquires basic information of the one or more second terminals and determines whether the basic information satisfies one or more predetermined push conditions;
in response to the basic information satisfying the one or more predetermined push conditions, the server sends the installation information of the application to the one or more second terminals related to the first terminal; and
in response to the basic information not satisfying the one or more predetermined push conditions, the server downloads an installation package of the application to a cloud database based on at least information associated with the installation information of the application, records new installation information of the application and sends the new installation information of the application to the one or more second terminals when the basic information of the one or more second terminals satisfies the predetermined push conditions;
wherein the receiving, by the one or more second terminals, the installation information of the application and the installing, by the one or more second terminals, the application based on at least information associated with the installation information of the application include:
receiving, by the one or more second terminals, the new installation information of the application; and
installing the application according to the new installation information of the application.

9. The method of claim 8, wherein:
the server receives a push instruction that carries the installation information of the application from the first terminal and determines whether the push instruction includes a first predefined identifier or a second predefined identifier;
the first terminal generates a first sending widget and a second sending widget upon detection of the application-push event being triggered;
upon detection of the first sending widget being triggered, the first terminal sends to the server the push instruction carrying a first predefined identifier; and
upon detection of the second sending widget being triggered, the first terminal sends to the server the push instruction carrying a second predefined identifier;
in response to the push instruction including the first predefined identifier, the server sends a first push message to the one or more second terminals related to the first terminal, the first push message containing the installation information of the application and the first predefined identifier; and
in response to the push instruction including the second predefined identifier, the server sends a second push message to the one or more second terminals related to the first terminal, the second push message containing the installation information of the application and the second predefined identifier;
wherein the receiving, by the one or more second terminals, the installation information of the application and the installing, by the one or more second terminals, the application based on at least information associated with the installation information of the application include:
in response to the one or more second terminals receiving the first push message containing the first predefined identifier, installing, by the one or more second terminals, the application based on at least information associated with the installation information of the application;
in response to the one or more second terminals receiving the second push message containing the second predefined identifier, outputting, by the one or more second terminals, a push prompt message to a user; and installing the application based on at least information associated with user operations and the installation information of the application.

10. The method of claim 8, wherein the push conditions include that the one or more second terminals are on and have used a second account the same as or related to a first account of the first terminal.

11. The method of claim 8, wherein the receiving, by the one or more second terminals, the installation information of the application and the installing, by the one or more second terminals, the application based on at least information associated with the installation information of the application include:

receiving, by the one or more second terminals, the installation information of the application; and detecting whether a network environment includes a Wi-Fi environment;

in response to the network environment not including a Wi-Fi environment, outputting a flow-prompt message to a user to notify the user that continuing to install the application consumes bandwidth;

popping up a selection window for the user to choose whether to continue the installation; and determining whether to continue the installation or abandon the installation based on at least information associated with user operations.

\* \* \* \* \*